United States Patent
Takase et al.

(10) Patent No.: US 11,101,756 B2
(45) Date of Patent: Aug. 24, 2021

(54) MOTOR CONTROL UNIT AND ELECTRIC POWER STEERING APPARATUS EQUIPPED WITH THE SAME

(71) Applicant: NSK LTD., Tokyo (JP)

(72) Inventors: Hiroaki Takase, Tokyo (JP); Ryo Minaki, Tokyo (JP); Takayoshi Sugawara, Tokyo (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 16/605,874

(22) PCT Filed: Jan. 29, 2019

(86) PCT No.: PCT/JP2019/002845
§ 371 (c)(1),
(2) Date: Oct. 17, 2019

(87) PCT Pub. No.: WO2019/151200
PCT Pub. Date: Aug. 8, 2019

(65) Prior Publication Data
US 2020/0382032 A1    Dec. 3, 2020

(30) Foreign Application Priority Data

Jan. 31, 2018 (JP) .............................. JP2018-015336
Nov. 5, 2018 (JP) .............................. JP2018-208294

(51) Int. Cl.
*H02P 21/05* (2006.01)
*H02P 21/22* (2016.01)
(Continued)

(52) U.S. Cl.
CPC ............ *H02P 21/05* (2013.01); *B62D 5/0463* (2013.01); *B62D 5/0487* (2013.01); *H02P 21/13* (2013.01); *H02P 21/22* (2016.02); *H02P 27/12* (2013.01)

(58) Field of Classification Search
CPC . B62D 6/00; B62D 5/046; H02M 1/38; H02P 7/00; H02P 21/18; H02P 29/60; H02P 27/08
See application file for complete search history.

(56) References Cited

U.S. PATENT DOCUMENTS

2007/0029959 A1\* 2/2007 Ta .......................... B62D 5/046
318/432
2014/0035491 A1\* 2/2014 Mukai .................... B62D 5/046
318/400.02
(Continued)

FOREIGN PATENT DOCUMENTS

JP    2004-064948 A    2/2004
JP    2005-124359 A    5/2005
(Continued)

OTHER PUBLICATIONS

Written Opinion for PCT/JP2019/002845, dated May 7, 2019.
International Search Report for PCT/JP2019/002845, dated May 7, 2019.

*Primary Examiner* — Eduardo Colon Santana
*Assistant Examiner* — Said Bouziane
(74) *Attorney, Agent, or Firm* — Sughrue Mion, PLLC

(57) ABSTRACT

A motor control unit that vector-controls a 3-phase brushless motor based on a d-axis voltage command value and a q-axis voltage command value via an inverter with feedback-controlling, comprises: a central processing unit which comprises: a dq-axes dead time compensating section to calculate dq-axes dead time compensation values of the inverter and perform a dead time compensation; and a dq-axes disturbance estimating observer to input a d-axis current command value, a q-axis current command value, a motor rotational number, a motor angular velocity, a d-axis feedback current, a q-axis feedback current, the d-axis voltage command value and the q-axis voltage command (Continued)

value and calculate a d-axis disturbance compensation value and a q-axis disturbance compensation value, which cannot be compensated by the dead time compensation, by respectively adding the d-axis disturbance compensation value and the q-axis disturbance compensation value to the d-axis voltage command value and the q-axis voltage command value.

20 Claims, 29 Drawing Sheets

(51) Int. Cl.
*B62D 5/04* (2006.01)
*H02P 21/13* (2006.01)
*H02P 27/12* (2006.01)

(56) References Cited

U.S. PATENT DOCUMENTS

2016/0111991 A1\* 4/2016 Hozuki ............ H02P 21/14
 318/400.02
2017/0131379 A1\* 5/2017 Omata ............ H02P 29/0241

FOREIGN PATENT DOCUMENTS

| JP | 2007-252163 A | 9/2007 |
| JP | 4681453 B2 | 5/2011 |
| JP | 2013-215064 A | 10/2013 |
| JP | 2015-171251 A | 9/2015 |
| WO | 2018/016476 A1 | 1/2018 |

\* cited by examiner

PRIOR ART

PRIOR ART

PRIOR ART

FIG.21A

CURRENT COMMAND VALUE Icm(Icma)[A]

HYSTERESIS THRESHOLD +
+0.25
0 ─────────── TIME [s]
-0.25
HYSTERESIS THRESHOLD −

INPUT SIGNAL

FIG.21B

COMPENSATION SIGN SN
+1
0 ─────────── TIME [s]
−1

FIG.22

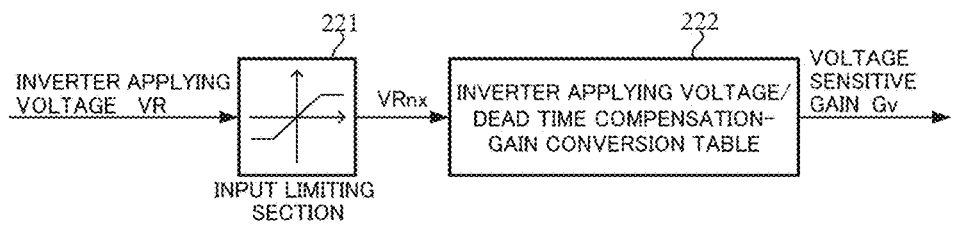

INVERTER APPLYING VOLTAGE VR → [221 INPUT LIMITING SECTION] → VRnx → [222 INVERTER APPLYING VOLTAGE/ DEAD TIME COMPENSATION-GAIN CONVERSION TABLE] → VOLTAGE SENSITIVE GAIN Gv

FIG.23

VOLTAGE SENSITIVE GAIN $G_v$ 1.2
0.7

0    9.0    15.0    INVERTER APPLYING VOLTAGE VRnx [V]

MOTOR CONTROL UNIT AND ELECTRIC POWER STEERING APPARATUS EQUIPPED WITH THE SAME

CROSS REFERENCE TO RELATED APPLICATIONS

This application is a National Stage of International Application No. PCT/JP2019/002845 filed Jan. 29, 2019, claiming priority based on Japanese Patent Application No. 2018-015336 filed Jan. 31, 2018 and Japanese Patent Application No. 2018-208294 filed Nov. 5, 2018.

TECHNICAL FIELD

The present invention relates to a motor control unit that vector-controls a driving of a 3-phase brushless motor using a dq-axes rotational coordinate system and compensates a dead time of an inverter and an electric power steering apparatus equipped with the motor control unit, in particular to the motor control unit that performs a dq-axes dead time compensation, estimates a disturbance, which cannot be compensated by the dead time compensation, by a dq-axes disturbance estimating observer, performs a space vector modulation and improves a steering responsibility, an abnormal sound and a vibration of the motor, a torque ripple characteristic, a responsibility depending on a motor rotational number, a noise-resistance and a compensation accuracy by enhancing a motor model accuracy in response to a dq-axes current command value, and the electric power steering apparatus equipped with the above motor control unit.

BACKGROUND ART

A motor control unit which controls an object by driving a motor is used in an electric power steering apparatus (EPS: Electric Power Steering System), an electric assist bicycle, a train, an electric vehicle and the like. The electric power steering apparatus which is equipped with the motor control unit and provides a steering mechanism of a vehicle with a steering assist torque (an assist torque) by means of a rotational torque of a motor, applies a driving force of the motor as an actuator to a steering shaft or a rack shaft by means of a transmission mechanism such as gears or a belt through a reduction mechanism. In order to accurately generate the steering assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a steering angle sensor 14 for detecting a steering angle θh and a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor by means of a voltage control command value Vref obtained by performing a compensation or the like to the calculated current command value. A steering angle sensor 14 is not indispensable and may not be provided. It is possible to obtain the steering angle (a motor rotational angle) θ from a rotational position sensor such as a resolver which is connected to the motor 20.

A controller area network (CAN) 40 to send/receive various information and signals on the vehicle is connected to the control unit 30, and it is also possible to receive the vehicle speed Vs from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a central processing unit (CPU) (including a micro processor unit (MPU) and a micro controller unit (MCU)), and general functions performed by programs within the CPU are, for example, shown in FIG. 2.

Functions and operations of the control unit 30 will be described with reference to FIG. 2. The steering torque Th from the torque sensor 10 and the vehicle speed Vs from the vehicle speed sensor 12 are inputted into a steering assist command value calculating section 31. The steering assist command value calculating section 31 calculates a steering assist command value Iref1 based on the steering torque Th and the vehicle speed Vs using an assist map or the like. The calculated steering assist command value Iref1 is added with a compensation signal CM for improving characteristics from a compensating section 34 at an adding section 32A. The steering assist command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

A deviation current ΔI (=Irefm−Im) which is the subtracted result at the subtracting section 32B is current-controlled a proportional integral (PI) and the like at a PI-control section 35. The voltage control command value Vref obtained by the current-control, and a modulation signal (a triangle wave carrier) CF are inputted into a PWM-control section 36, and a duty command value is calculated. The motor 20 is PWM-driven by an inverter 37 with a PWM signal calculated the duty command value. The motor current value Im of the motor 20 is detected by a motor current detector 38 and is inputted into the subtracting section 32B for the feedback.

The compensating section 34 adds a self-aligning torque (SAT) detected or estimated and an inertia compensation value 342 at an adding section 344. The added result is further added with a convergence control value 341 at an adding section 345. The added result is inputted into the adding section 32A as the compensation signal CM and the control characteristics are improved.

Recently, a 3-phase brushless motor is mainly used as an actuator of the electric power steering apparatus, and since the electric power steering apparatus is automotive products, the operating temperature range is wide. From a view point of a fail-safe, a dead time of the inverter to drive the motor needs greater than that for general industrial purposes that home appliances (industrial equipment<EPS). Generally, since a switching device (for example, a field-effect transistor (FET)) has a delay time when the operation is turned-OFF, a direct current (DC) link is shorted when the switching devices of an upper-arm and a lower-arm simultaneously switches a "turn-OFF" operation and a "turn-ON" operation. In order to prevent the above problem, a time (a dead time) that the operations of the switching devices of both arms are "turn-OFF", is set.

As a result, a current waveform is distorted, and the responsibility of the current control and a steering feeling are badly affected. For example, when the driver slowly steers the handle in a situation that the handle is around a straight running state (an on-center state), a discontinuous steering feeling by means of the torque ripple and the like is occurred. Because the back-EMF (back electromotive force) of the motor in a middle speed or a high speed steering, and the interference voltage between the windings operate as the disturbance against the current-control, the steering follow-up performance and the steering feeling in a turn-back steering are badly affected. The steering sound is also louder in the middle speed or the high speed steering.

A q-axis that controls the torque of a rotor of the 3-phase brushless motor, and a d-axis that controls strength of a magnetic field are independently set. Since the d-axis crosses at 90° against the q-axis, the vector control system that controls the vectors corresponding to the respective axes currents (a d-axis current command value and a q-axis current command value) is widely known.

FIG. 3 shows a configuration example of driving-controlling the 3-phase brushless motor 100 by using the vector control system. Steering-assist command values of the two-axes (the dq-axes coordinate system) that are calculated at the steering assist command value calculating section (not shown) based on the steering torque Th, the vehicle speed Vs and the like, are calculated. The d-axis current command value $i_d$ and the q-axis current command value $i_q$* whose max values are limited are inputted into the subtracting sections 131$d$ and 131$q$, respectively. The current deviations $\Delta i_d$* and $\Delta i_q$* that are calculated at the subtracting sections 131$d$ and 131$q$ are inputted into the proportional integral control sections (PI-control sections) 120$d$ and 120$q$, respectively. The voltage command values $v_d$ and $v_q$ that are PI-controlled at the PI-control sections 120$d$ and 120$q$ are inputted into the subtracting section 121$d$ and the adding section 121$q$, respectively. Command voltages $\Delta v_d$ and $\Delta v_q$ that are calculated at the subtracting section 121$d$ and the adding section 121$q$ are inputted into a dq-axes/3-phase alternating current (AC) converting section 150. The voltage command values Vu*, Vv* and Vw* that are converted into the three phases at the dq-axes/3-phase AC converting section 150 are inputted into a duty command value calculating section 160A in the PWM-control section 160 and the 3-phase duty command values Duty$_u$, Dut$_v$ and Duty$_w$ calculated in synchronized with the modulation signal CF are inputted into a PWM-control circuit 160B. The 3-phase PWM-signals $U_{PWM}$, $V_{PWM}$ and $W_{PWM}$ are generated at the PWM-control circuit 160B. The motor 100 is driven with the PWM-signals $U_{PWM}$, $V_{PWM}$ and $W_{PWM}$ via the inverter (inverter applying voltage VR) 161 constituted by a bridge configuration of an upper-arm and a lower-arm as shown in FIG. 4. The upper-arm comprises FETs Q1, Q3 and Q5 serving as switching devices and the lower-arm comprises FETs Q2, Q4 and Q6.

The 3-phase motor currents $i_u$, $i_v$ and $i_w$ of the motor 100 are detected at the current detector 162, and the detected 3-phase currents $i_u$, $i_v$ and $i_w$ are inputted into the 3-phase AC/dq-axes converting section 130. The 2-phase feedback current $i_d$ and $i_q$ that are converted at the 3-phase AC/dq-axes converting section 130 are subtraction-inputted into the subtracting sections 131$d$ and 131$q$, and a dq-axes non-interference control section 140. The rotational sensor or the like is attached to the motor 100, and the motor rotational angle θ and the motor angular velocity ω are outputted from the angle detecting section 110 that processes a sensor signal. The motor rotational angle θ is inputted into the dq-axes/3-phase AC converting section 150 and the 3-phase AC/dq-axes converting section 130, and the motor angular velocity ω is inputted into the dq-axes non-interference control section 140. The 2-phase voltages $v_{n1d}$ and $v_{n1q}$ from the dq-axes non-interference control section 140 are inputted into the subtracting section 121$d$ and the adding section 121$q$, respectively, and the command voltages $\Delta v_d$ and $\Delta v_q$ are calculated in the subtracting section 121$d$ and the adding section 121$q$. The command voltages $\Delta v_d$ and $\Delta v_q$ are inputted into the dq-axes/3-phase AC converting section 150.

The electric power steering apparatus of the vector control system described above is an apparatus to assist the steering of the driver, and a sound and a vibration of the motor, a torque ripple and the like are transmitted to the driver as a force sense via the handle. The field-effect transistors (FETs) are generally used as the power devices to drive the inverter, and the current is applied to the motor. In a case that the 3-phase motor is used, the FETs, which are connected in series for respective phases, of the upper-arm and the lower-arm are used as shown in FIG. 4. Although the FETs of the upper-arm and the lower-arm are alternatively turned-ON and turned-OFF, the FET does not simultaneously turn-ON and turn-OFF in accordance with a gate signal since the FET is not an ideal switching device. Therefore, a turn-ON time and a turn-OFF time are needed. Consequently, if an ON-command for the upper-arm FET and an OFF-command for the lower-arm FET are simultaneously inputted, there is a problem that the upper-arm FET and the lower-arm FET simultaneously turn-ON and the upper-arm and the lower-arm become short circuits. There is a difference between the turn-ON time and the turn-OFF time of the FET. Thus, when the command is inputted into the FETs at the same time, the FET immediately turns-ON in a case that the turn-ON time is short (for example, 100 [ns]) by inputting the ON-command to the upper-FET, and reversely, the FET does not immediately turn-OFF in a case that the turn-OFF time is long (for example, 400 [ns]) by inputting the OFF-command to the lower-FET. In this way, a state (for example, between 400 [ns]-100 [ns], ON-ON) that the upper-FET is "ON" and the lower FET is "ON", often momentarily occurs.

In this connection, in order that the upper-arm FET and the lower-arm FET do not simultaneously turn-ON, the ON-signal is usually given to the gate driving circuit with a predetermined period being a dead time. Since the dead time is nonlinear, the current waveform is distorted, the responsibility of the control is badly affected and the sound, the vibration and the torque ripple are generated. In a column type electric power steering apparatus, since an arrangement of the motor directly connected to a gear box which is connected by the handle and the column shaft made of steel is extremely near the driver in the mechanism, it is necessary to especially consider the sound, the vibration, the torque ripple and the like due to the motor in comparison with a downstream type electric power steering apparatus as shown in FIG. 5. In the downstream type electric power steering apparatus, the motor 20 operates the reduction gears 3 via a belt 21.

Conventionally, as a method to compensate the dead time of the inverter, there are methods to add the compensation value to the dead time by detecting a timing occurring the dead time and to compensate the dead time by a disturbance observer on the dq-axes in the current control.

The electric power steering apparatus to compensate the dead time is disclosed in, for example, Japanese Patent No. 4681453 B2 (Patent Document 1) and Japanese Unexamined Patent Publication No. 2015-171251 A (Patent Document 2). In Patent Document 1, there is provided a dead band compensation circuit that generates a model current based on the current command values by inputting the current command values into a reference model circuit of the current control loop including the motor and the inverter, and compensates the influence of the dead time of the inverter based on the model current. Further, in Patent Document 2, there is provided a dead time compensating sect ion to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value.

THE LIST OF PRIOR ART DOCUMENTS

Patent Documents

Patent Document 1: Japanese Patent No. 4681453 B2
Patent Document 2: Japanese Unexamined Patent Publication No. 2015-171251 A
Patent Document 3: Japanese Unexamined Patent Publication No. 2007-252163 A

SUMMARY OF THE INVENTION

Problems to be Solved by the Invention

The apparatus disclosed in Patent Document 1 is a system that estimates the compensation sign by using a calculation of the dead time compensation amount due to the q-axis current command value and the 3-phase current reference model. The output value of the compensation circuit is a changing value in proportion to the model current in a region being a predetermined fixed value or less, and is an addition value of the changing values in proportion to the fixed value and the model current in a region being the predetermined fixed value or more. In this way, the output value of the compensation circuit is outputted from the current command to the voltage command. However, the tuning operation for determining the hysteresis characteristic to output the predetermined fixed value is necessary.

Further, in the apparatus disclosed in Patent Document 2, when the dead time is determined, the dead time compensation is performed by using the q-axis current command value and the compensation value LPF-processed the q-axis current command value. Thus, the delay occurs, and there is a problem that the dead time compensation value is not operated for the final voltage command to the motor.

Japanese Unexamined Patent Publication No. 2007-252163 A (Patent Document 3) discloses that the dead time compensation is performed by a disturbance estimating observer. Although the disturbance observer on the dq-axes estimates the dead time as the voltage disturbance, since the third-order component of the signal is eliminated in the dq-axes/3-phase coordinate transformation, there is a problem that the effect by the disturbance estimating observer is not adequate.

In other words, there conventionally exists a method to perform the feedforward (FF) compensation by detecting a timing in which the dead time is occurred, and a method to compensate the back electromotive force voltage (the back-EMF) depending on the angular velocity by the feedforward. There also exists a method to simultaneously compensate the disturbances such as the dead time and the back-EMF by the disturbance observer on the dq-axes. In the methods to compensate the disturbances by the feedforward, there is a deviation between an actual dead time and the dead time compensation value which is set in a design stage because the individual difference of the ECU (the individual differences such as the FETs, the driving circuits of the FETs and the detection circuits), the aged deterioration (the characteristic changing of the FETs and the driving circuits of the FETs (as a specific example, the duty-current characteristic of the switching characteristic including the dead time in the "turn-ON" operation and the "turn-OFF" operation of the FET devices)), the characteristic changing of the detection circuit (as a specific example, the fine resistance value changing of shunt resistors for the current detection and the motor windings) and the like are existed. There is also a deviation between the back-EMF compensation value and the actual back-EMF value because of the individual difference of the motor and the like. Therefore, there exists a case that the disturbances cannot be compensated by only the feedforward compensation. In a case of the normal disturbance observer, the dead time and the back-EMF are simultaneously compensated. There exists a case that the oscillation is occurred because the disturbances are too large depending on the control band and cannot be compensated. There also exists a case that the steering feeling is badly affected by the influence of the noise depending on the setting of the band limiting filter.

Although the current distortion is roughly improved by the dead time compensation function and the dq-axes non-interference control, there exists a concern that the characteristic of the current distortion by the dead time is changed by the individual difference of the ECU, the aged deterioration and the like. By setting the design value or measuring the loss voltage due to the dead time, the feedforward type dead time compensation amount, for example a fixed value 0.40 [V], is written in the ECU. However, when the loss voltage due to the dead time is changed to 0.42 [V] by the aged deterioration, the current distortion becomes larger since the compensation amount is not adequate. In the motor, there exists a case that the variation of the back-EMF due to the individual difference and the back-EMF except for the first order component cannot be handled by only the dq-axes non-interference control. (The general variation is as follows. For example, the variation which has a 2.6 [V]/1000 [rpm] back-EMF (±3%) per one phase variation of the first order component and cannot be handled. When the variation of the first order component is set to "100%", the variations of the fifth and seventh order components are "±0.3%". (The above percentages are different from the motors.) In a case of converting the dq-axes, the fifth and seventh order components are converted into the sixth order component.) In a case of a transient steering input (for example, an abrupt steering such as, for example, a step input that a handle is instantaneously steered from 0° to 90° and then is stopped), following-up the abrupt inverse input from tires or the like, only the PI-control and the dq-axes non-interference control cannot follow-up such a transient input because of the delay of the output system and the detection system, the delay of the correction function in which the rotational number is used and the like. The current control responsibility by only the PI-control is, for example, 300 [Hz] in a case that the PI-control responsibility is fixed. In a case that the responsibility variable function is effective, the PI-control responsibility becomes variable by the motor rotational number and the current control responsibility is, for example, in a range of 80 [Hz] (in a case of the steering holding) to 450 [Hz] (in a case of the high speed steering). In a case of the steering holding, the PI-control responsibility decreases for reduction of the steering holding vibration. In a case of the high speed steering, the PI-control responsibility increases for improving the followability.

The present invention has been developed in view of the above-described circumstances, and an object of the present invention is to provide the motor control unit of the vector control system that improves the distortion of the current waveform and the responsibility of the current control, and suppresses the sound and the vibration of the motor and the torque ripple by compensating the dead time of the inverter and estimating the disturbance described below which is not compensated by the dead time compensation, and the electric power steering apparatus equipped with the motor control unit.

Means for Solving the Problems

The present invention relates to a motor control unit that vector-controls a 3-phase brushless motor based on a d-axis current command value and a q-axis current command value, converts 3-phase current detection values of the 3-phase brushless motor into a d-axis feedback current and a q-axis feedback current, performs feedbacks of the d-axis feedback current and the q-axis feedback current to the d-axis current command value and the q-axis current command value, converts a d-axis deviation voltage and a q-axis deviation voltage of the feedback into 2-phase duty command values, converts the 2-phase duty command values into 3-phase duty command values, and vector-controls the 3-phase brushless motor via an inverter, the above-described object of the present invention is achieved by that: comprising a dq-axes dead time compensating section to calculate dq-axes dead time compensation values of the inverter and perform a dead time compensation, and a dq-axes disturbance estimating observer to input the d-axis current command value, the q-axis current command value, a motor rotational number, the d-axis feedback current, the q-axis feedback current, the d-axis deviation voltage and the q-axis deviation voltage, and calculate and output a d-axis disturbance compensation value and a q-axis disturbance compensation value, wherein the motor control unit estimates a disturbance, which cannot be compensated by the dead time compensation of the inverter, by respectively adding the d-axis disturbance compensation value and the q-axis disturbance compensation value with the d-axis deviation voltage and the q-axis deviation voltage.

The present invention relates to a motor control unit that vector-controls a 3-phase brushless motor based on a d-axis current command value and a q-axis current command value, converts 3-phase current detection values of the 3-phase brushless motor into a d-axis feedback current and a q-axis feedback current, respectively current-controls a d-axis deviation current between the d-axis current command value and the d-axis feedback current and a q-axis deviation current between the q-axis current command value and the q-axis feedback current, calculates a d-axis voltage command value and a q-axis voltage command value, and controls the 3-phase brushless motor by 3-phase duty command values based on the d-axis voltage command value and the q-axis voltage command value via an inverter, the above-described object of the present invention is achieved by that: comprising a d-axis dead time compensating section and a q-axis dead time compensating section to calculate dead time compensation values of the inverter and perform a dead time compensation, a d-axis disturbance estimating observer to input the d-axis current command value, the d-axis voltage command value, the d-axis feedback current, the q-axis feedback current, a motor angular velocity and a motor rotational number, and calculate and output a d-axis disturbance compensation value, and a q-axis disturbance estimating observer to input the q-axis current command value, the q-axis voltage command value, the q-axis feedback current, the d-axis feedback current, the motor angular velocity and the motor rotational number, and calculate and output a q-axis disturbance compensation value, wherein the d-axis disturbance estimating observer comprises a d-axis non-interference model to input the q-axis feedback current and the motor angular velocity, a d-axis low pass filter (LPF) to input a second d-axis addition value which adds an output of the d-axis non-interference model to a first d-axis addition value which adds the d-axis voltage current command value to the d-axis disturbance compensation value, a d-axis motor inverse model to input the d-axis feedback current, a d-axis subtracting section to calculate a d-axis deviation voltage by subtracting an output of the d-axis motor inverse model from an output of the d-axis LPF, a d-axis sensitive gain section to multiply the d-axis deviation voltage with a gain, depending on the motor rotational number, and a d-axis compensation value limiting section to limit an output of the d-axis sensitive gain section and output the d-axis disturbance compensation value, wherein the q-axis disturbance estimating observer comprises a q-axis non-interference model to input the d-axis feedback current and the motor angular velocity, a q-axis LPF to input a q-axis subtraction value which subtracts an output of the q-axis non-interference model from a first q-axis addition value which adds the q-axis voltage command value to the q-axis disturbance compensation value, a q-axis motor inverse model to input the q-axis feedback current, a q-axis subtracting section to calculate a q-axis deviation voltage by subtracting an output of the q-axis motor inverse model from an output of the q-axis LPF, a q-axis sensitive gain section to multiply the q-axis deviation voltage by a gain, depending on the motor rotational number, and a q-axis compensation value limiting section to limit an output of the q-axis sensitive gain section and output the q-axis disturbance compensation value, and wherein the motor control unit estimates a disturbance, which cannot be compensated by the dead time compensation of the inverter, by adding with the d-axis disturbance compensation value and the d-axis voltage command value and adding the q-axis disturbance compensation value and the q-axis voltage command value.

The above-described object of the present invention is efficiently achieved by that wherein an electric power steering apparatus that is equipped with the motor control unit, and applies an assist torque to a steering system of a vehicle by driving the 3-phase brushless motor.

Effects of the Invention

According to the electric power steering apparatus of the present invention, in a case that the actual dead time compensation value is deviated from the dead time compensation value which is set in a design stage, due to the individual difference, the aged deterioration and the like, or in a case that the back-EMF is deviated from the designed value due to the back-EMF and the individual difference of the motor, the dead time compensation and the back-EMF compensation to the deviated value can be performed. Since the followability in a case that the transient steering input which is not followed-up by only the PI-control and the dq-axes non-interference control is performed is improved and the disturbance is estimated by the disturbance estimating observer and application of the dead time compensation, the compensation to the disturbance which is not compensated by the dq-axes non-interference control and the dead time compensation can easily be performed. Because the disturbance estimating observer has a delay from the detection of the disturbance to the reflection of the compensation, there exists a case that the compensation is delayed. However, if the disturbance due to the dead time is preliminarily reduced by the dead time compensation, the disturbance estimating observer can estimate only the rest disturbance and the compensation can easily be performed.

The compensation value of the disturbance estimating observer can increase or decrease depending on the specific steering condition. For example, in a case that the followability is needed depending on the motor rotational number, the sensitive gain may become larger, and in a case of steering holding that the grip feeling is important, the sensitive gain may become smaller. The third-harmonic component which is eliminated by the dq-axes/3-phase AC coordinate transformation is compensated by the space vector modulation. Thereby, the accurate compensation can be realized.

Further, in the present invention, since the cutoff frequencies of the LPF for band-limiting of the disturbance estimating observer and the motor inverse model are variable depending on the motor rotational number, the followability and the noise-resistance can be improved. Since the inductance component (the inductance nominal value) of the motor inverse model of the disturbance estimating observer sensitive to the dq-axes current command values is variable, the accuracy of the motor model can be improved and the accuracy of the dead time compensation depending on the dq-axes current command values can also be improved.

BRIEF DESCRIPTION OF THE DRAWINGS

In the accompanying drawings:

FIGS. 21A and 21B are waveform charts showing an operation example of a compensation sign estimating section (a phase current compensation sign estimating section);

FIG. 22 is a block diagram showing a configuration example of an inverter applying voltage-sensitive gain section;

FIG. 23 is a characteristic diagram showing a characteristic example of the inverter applying voltage-sensitive gain section;

MODE FOR CARRYING OUT THE INVENTION

A current distortion is roughly improved by a dead time compensation function and a dq-axes non-interference control, but there is a concern that the current distortion due to a dead time is changed by an individual difference of an ECU, aged deterioration and the like. There exists a case that only dq-axes non-interference control cannot compensate motor back-EMF compensation except for the first-order component and a variation of the back-EMF due to the individual difference of the motor. Ina case that a transient steering is inputted, there is a problem that only the dq-axes non-interference control and the PI-control cannot follow-up the above transient steering because of a delay of an output system and a detection system, a delay of a correction function using a motor rotational number and the like. In order to improve these problems, an object of the present invention is to improve the current distortion in which the dead time compensation, the dq-axes non-interference control and the PI-control do not follow-up the current distortion, and the responsibility of the control. In the present invention, the configuration of the dq-axes disturbance estimating observer in which the dq-axes non-interference control is considered is proposed.

In the present invention, a cutoff frequency of an LPF for the band limitation of the dq-axes disturbance estimating observer is variable depending on the motor rotational number, and the responsibility and the noise-resistance are improved. An inductance component (the inductance nominal value) of a motor inverse model is also variable in response to the dq-axes current command values, the model accuracy is enhanced and the accuracy of the dead time compensation is further improved.

Although the motor control unit according to the present invention is applied to an electric assist bicycle, a train, an electric vehicle and the like, an example of the electric power steering apparatus equipped with the motor control unit will be described as follows.

Hereinafter, embodiments of the present invention will be described with reference to drawings.

Figure 3:
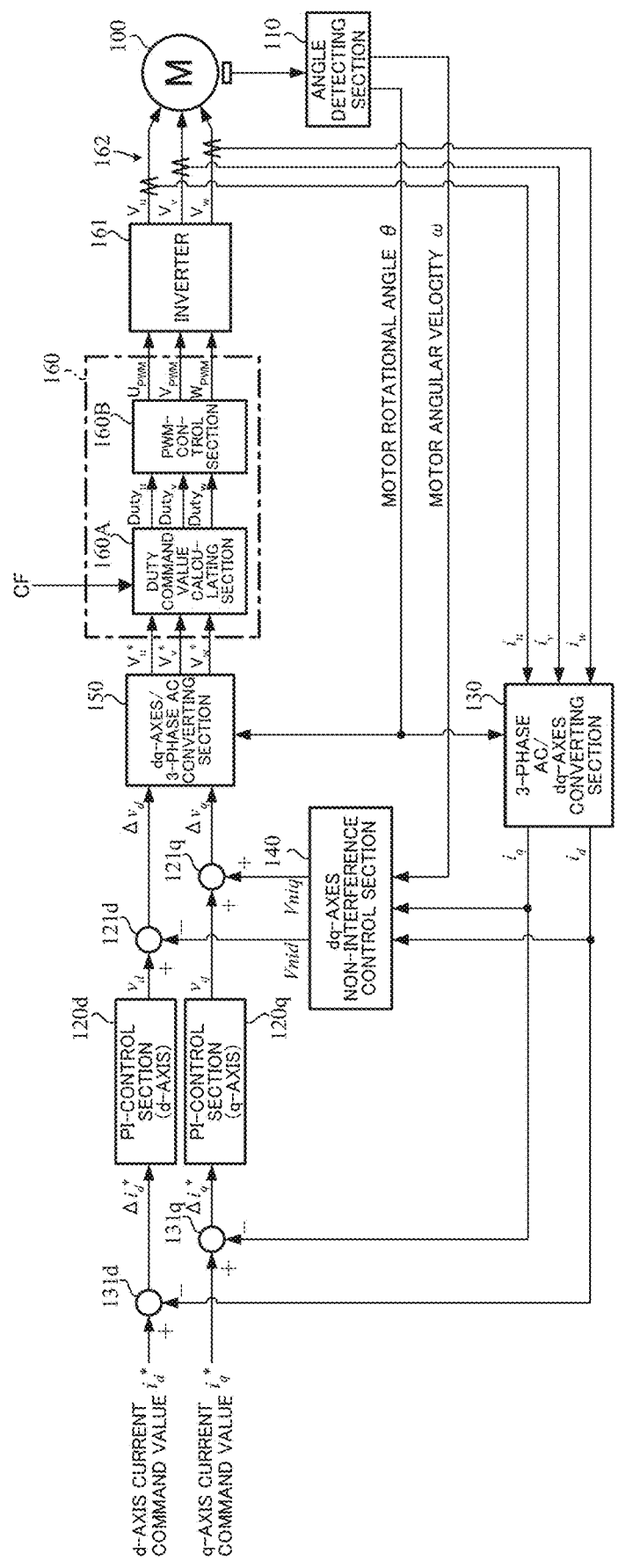
FIG. 3 is a block diagram showing a configuration example of a vector control system.
Figure 4:
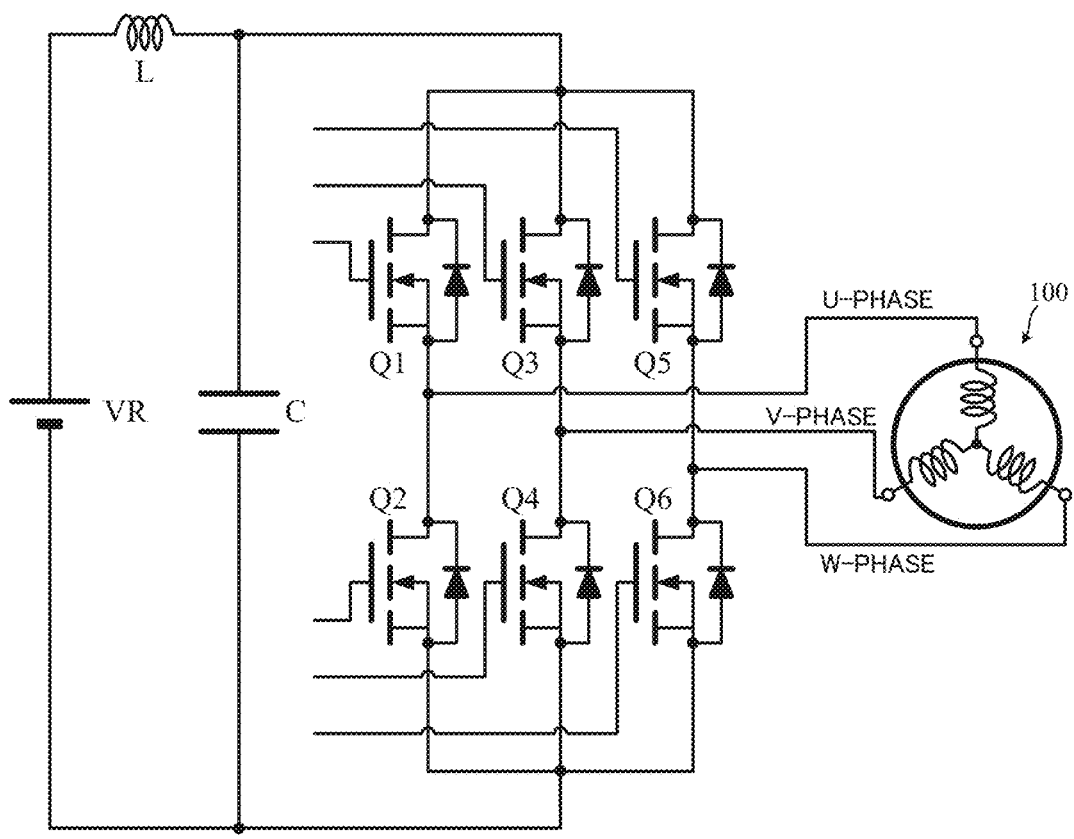
FIG. 4 is a wiring diagram showing a configuration example of a general inverter.
Figure 5:
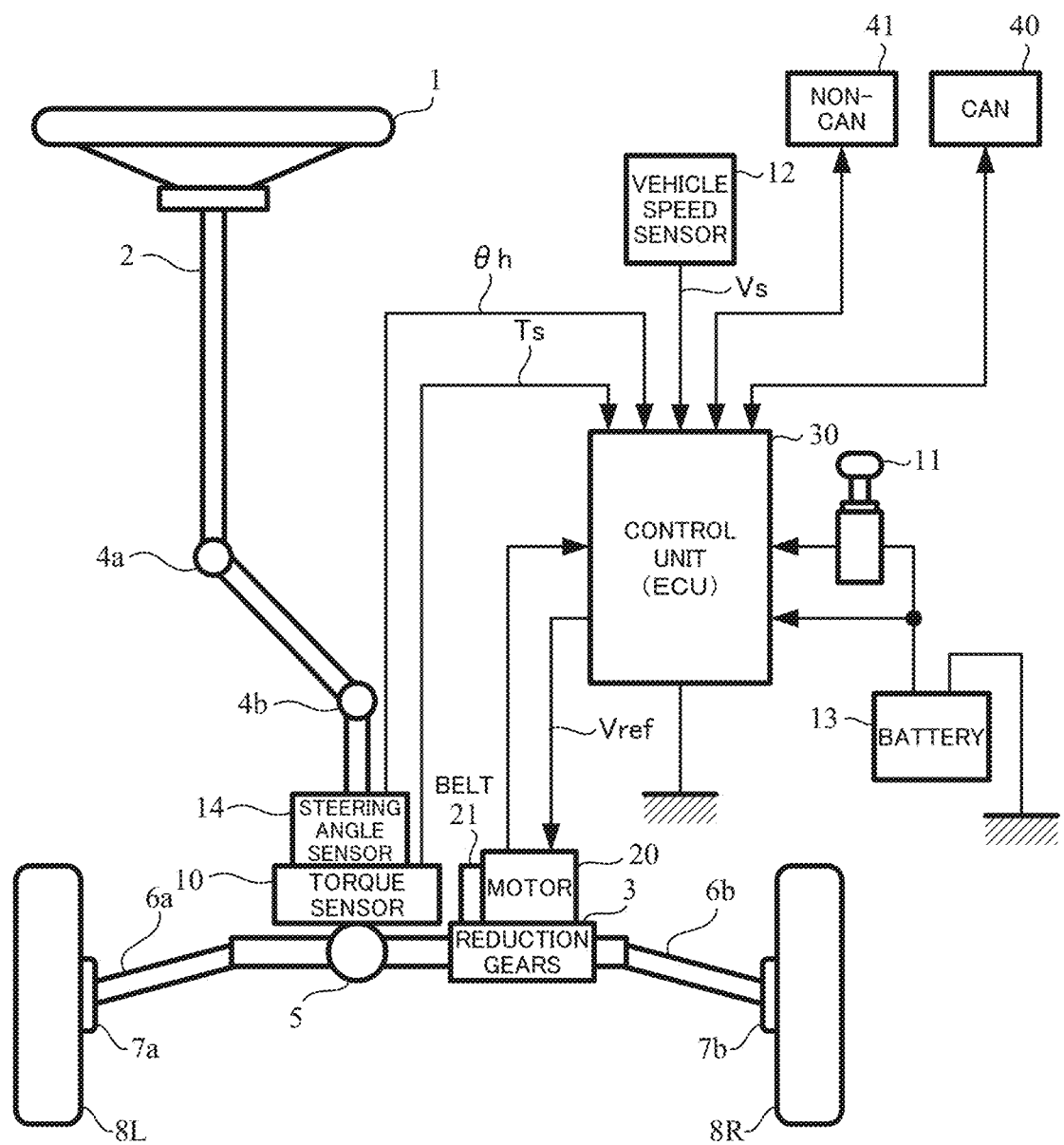
FIG. 5 is a configuration diagram showing a general outline of a downstream type electric power steering apparatus.
Figure 6:
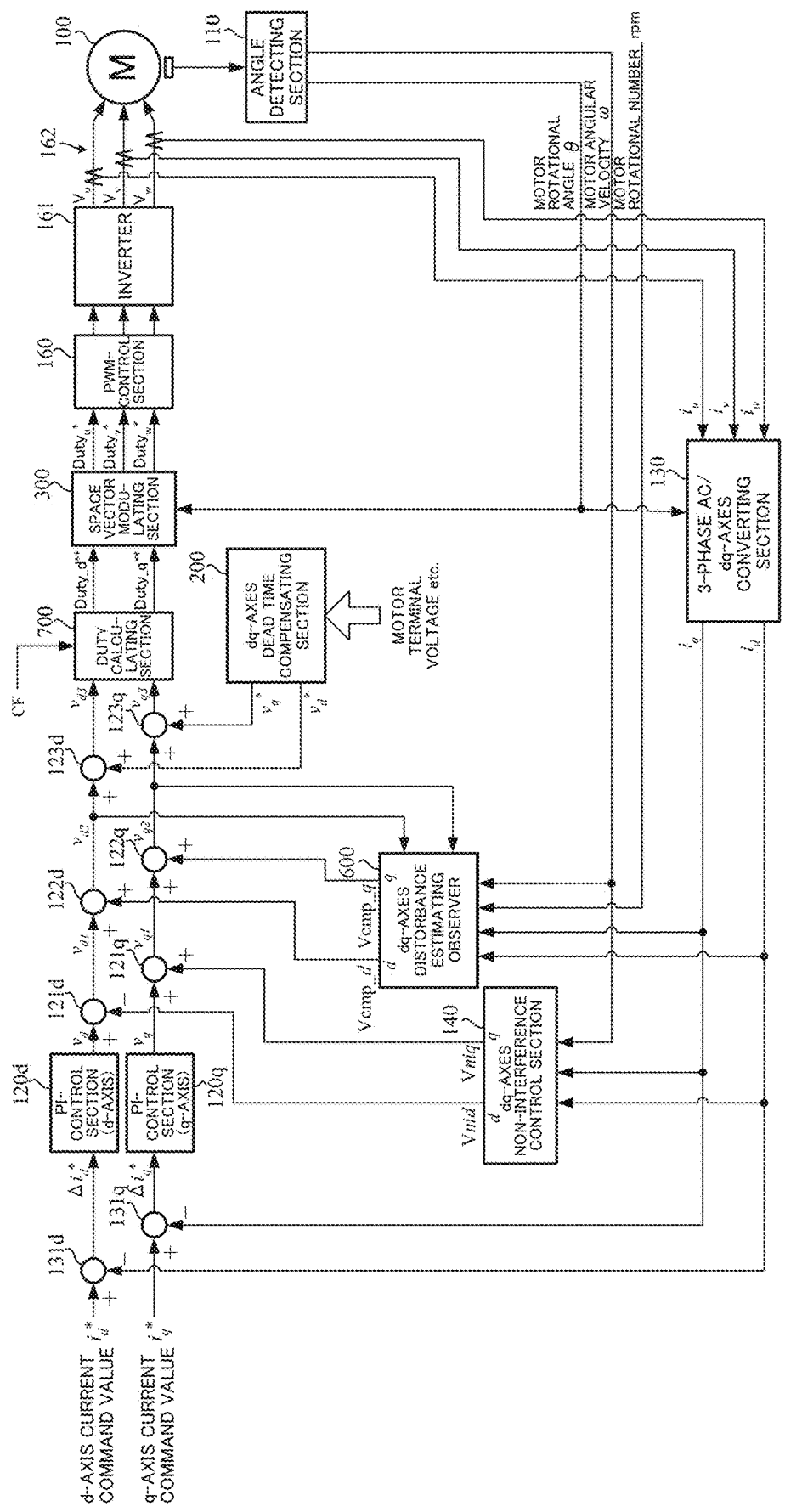
FIG. 6 is a block diagram showing a configuration example of the present invention.

FIG. 6 shows a whole configuration of the present invention corresponding to FIG. 3, and there is provided the dq-axes disturbance estimating observer 600 to input a motor angular velocity ω, a motor rotational number rpm, dq-axes feedback currents $i_q$ and $i_d$ and voltage command values $V_{d2}$ and $V_{q2}$ from adding sections 122$d$ and 122$q$ described below and output dq-axes disturbance compensation values $V_{cmp\_d}$ and $V_{cmp\_q}$. The adding sections 122$d$ and 122$q$ are disposed on dq-axes voltage paths and further the adding sections 123$d$ and 123$q$ are disposed at a subsequent stage of the adding sections 122$d$ and 122$q$, respectively. The dq-axes disturbance compensation values $V_{cmp\_d}$ and $V_{cmp\_q}$ are inputted into the adding sections 122$d$ and 122$q$, respectively. A dq-axes dead time compensating section 200 to input a motor terminal voltage and the like and calculate dead time compensation values $V_d^*$ and $V_q^*$ on the dq-axes is disposed, and the dead time compensation values $V_d^*$ and $V_q^*$ calculated at the dq-axes dead time compensating section 200 are inputted into the adding sections 123$d$ and 123$q$, respectively.

The motor rotational number rpm is calculated by differentiating the angle at an angle detecting section 110. As well, the motor angular velocity ω is also calculated at the angle detecting section 110. Here, the motor angular velocity ω is obtained by "ω=P×n×2π/60", where "P" is the number of pole pairs and "n" is the motor rotational number, the unit of the motor angular velocity is [rad/s], and the motor angular velocity ω is used in the current control calculation. The motor rotational number rpm is a mechanical angle rotational number, the unit of the motor rotational number rpm is [rpm] and the motor rotational number rpm is used in changing of the control conditions and the like. As understood by a human sense, the motor rotational number rpm is used in the control conditions.

The d-axis current command value $i_d^*$ and the q-axis current command value $i_q^*$ in which max values of steering-assist command values calculated at a steering-assist command value calculating section (not shown) are limited, are inputted into subtracting sections 131$d$ and 131$q$, respectively. Deviation currents $\Delta i_d^*$ and $\Delta i_q^*$ calculated at the subtracting sections 131$d$ and 131$q$ are PI-controlled at PI-control sections 120$d$ and 120$q$, and dq-axes voltages $V_d$ and $V_q$ which are PI-controlled (current-controlled) are inputted into a subtracting section 121$d$ and an adding section 121$q$, respectively. The voltages $V_{nid}$ and $V_{niq}$ are inputted from the dq-axes non-interference section 140 into the subtracting section 121$d$ and the adding section 121$q$, and the voltage command value $V_{d1}$ calculated at the subtracting section 121$d$ and the voltage command value $V_{q1}$ are inputted into the adding sections 122$d$ and 122$q$, respectively. The voltage command value $V_{d2}$ which is added with the voltage command value $V_{d1}$ and the dq-axes disturbance compensation value $V_{cmp\_d}$ at the adding section 122$d$ and the voltage command value $V_{q2}$ which is added with the voltage command value $V_{q2}$ and the dq-axes disturbance compensation value $V_{cmp\_q}$ at the adding section 122$q$ are inputted into the adding section 123$d$ and the adding section 123$q$, respectively. The voltage command values $V_{d2}$ and $V_{q2}$ are also inputted into the dq-axes disturbance estimating observer 600. The voltage command value $V_{d3}$ which is added with the voltage command value $V_{d2}$ and the dead time compensation value $V_d^*$ at the adding section 123d and the voltage command value $V_{q3}$ which is added with the voltage command value $V_{q2}$ and the dead time compensation value $V_q^*$ at the adding section 123q are inputted into the duty calculating section 700, and the duty values Duty_d and Duty_q which are calculated in synchronized with a modulation signal CF at the duty calculating section 700 are inputted into a space vector modulating section 300 described below in detail. The 3-phase duty values $Duty_u^*$, $Duty_v^*$ and $Duty_w^*$ which are vector-modulated at the space vector modulating section 300 are inputted into the PWM-control section 160 and the motor 100 is driven and is controlled via the PWM-control section 160 and the inverter 161.

Figure 7:
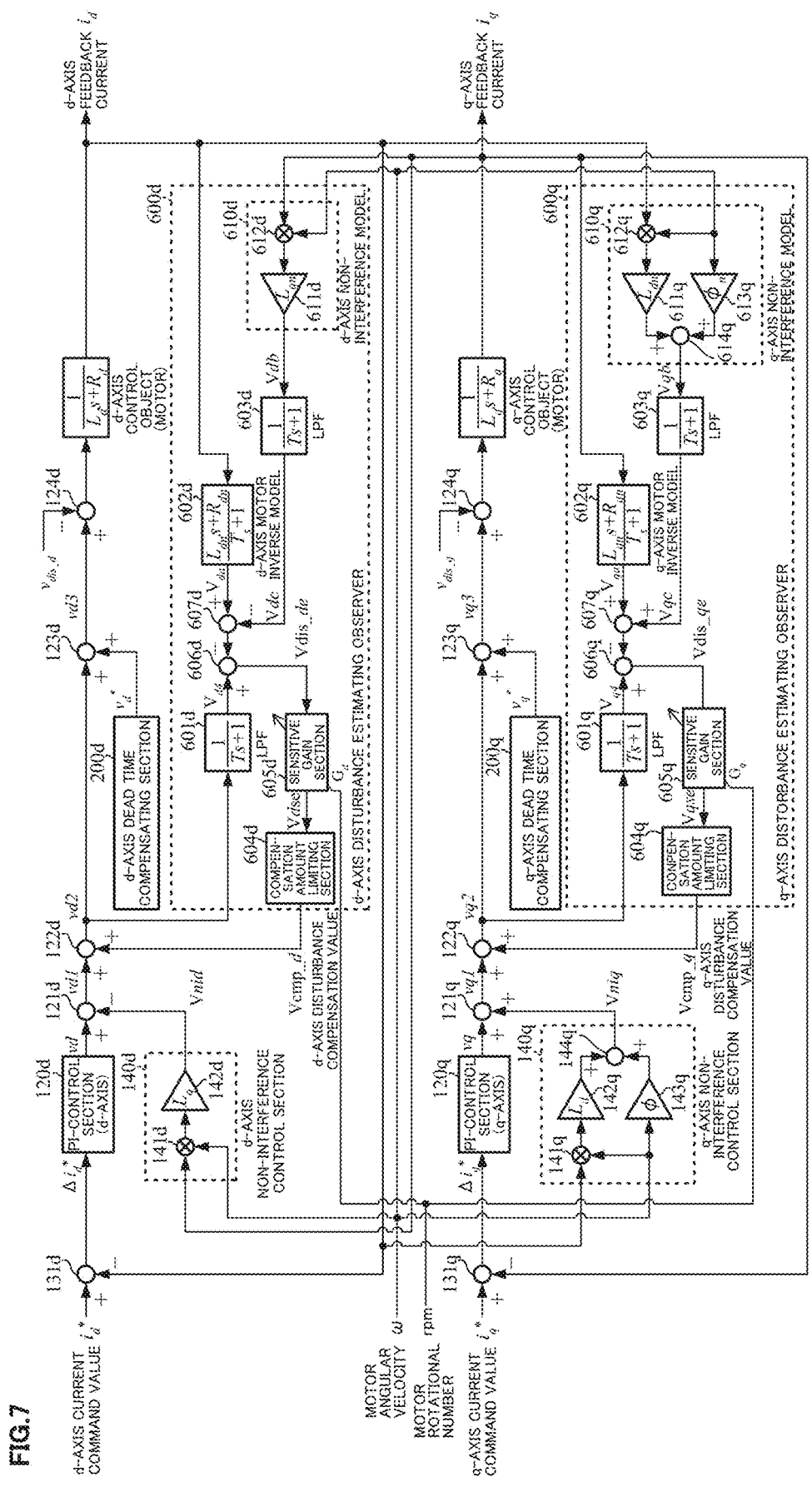
FIG. 7 is a block diagram showing a configuration example (the first embodiment) of a dq-axes disturbance estimating observer of the present invention.

FIG. 7 shows a detailed dead time compensation system including the dq-axes disturbance estimating observer 600 (the first embodiment). The dq-axes disturbance estimating observer 600 comprises a d-axis disturbance estimating observer 600d and a q-axis disturbance estimating observer 600q, and a dq-axes dead time compensating section 200 comprises a d-axis dead time compensating section 200d and a q-axis dead time compensating section 200q. A dq-axes non-interference control section 140 comprises a d-axis non-interference control section 140d and a q-axis non-interference control section 140q, the motor angular velocity ω and the q-axis feedback current $i_q$ are inputted into the d-axis non-interference control section 140d, and the motor angular velocity ω and the d-axis feedback current $i_d$ are inputted into the q-axis non-interference control section 140q. The d-axis non-interference control section 140d comprises a multiplying section 141d and a constant number section 142d (Lq), and the q-axis non-interference control section 140q comprises a multiplying section 141q, constant number sections 142q (Ld) and 143q (φ) and an adding section 144q.

The d-axis disturbance estimating observer 600d comprises a low pass filter (LPF) 601d for the first-order band limitation to input the voltage command value $V_{d2}$ from the adding section 122d, a d-axis motor inverse model 602d to input the d-axis feedback current $i_d$, a d-axis non-interference model 610d to input the motor angular velocity ω and the q-axis feedback current $i_q$n, an LPF 603d to input a voltage $V_{db}$ from the d-axis non-interference model 610d, a subtracting section 607d to calculate a deviation voltage $(=V_{da}-V_{dc})$ from the voltage $V_{da}$ inputted from the d-axis motor inverse model 602d and the voltage $V_{dc}$ inputted from the LPF 603d, a subtracting section 606d to subtract the deviation voltage $(=V_{da}-V_{dc})$ from the voltage $V_{d4}$ inputted from the LPF 601d, a sensitive gain section 605d to multiply a voltage $V_{dis\_de}$ inputted from the subtracting section 606d by a gain Gd sensitive to the motor rotational number rpm, and a compensation amount limiting section 604d to limit the upper and lower limit values of a voltage $V_{dse}$ from the sensitive gain section 605d and output the d-axis disturbance compensation value $V_{cmp\_d}$. The d-axis non-interference model 610d comprises a multiplying section 612d to input the motor angular velocity ω and the q-axis feedback current $i_q$, and a constant number section 611d to multiply the multiplied result at the multiplying section 612d with the constant number (Lqn) and output the voltage $V_{db}$.

The configuration of the q-axis disturbance estimating observer 600q is almost the same as that of the d-axis disturbance estimating observer 600d, and the corresponding sections are modified from the reference numeral "d" to the reference numeral "q". The differences between the d-axis disturbance estimating observer 600d and the q-axis disturbance estimating observer 600q are only the input sign of the adding section 607q and the configuration of the q-axis non-interference model 610q. That is, the q-axis non-interference model 610q in the q-axis disturbance estimating observer 600q comprises a multiplying section 612q to input the motor angular velocity ω and the d-axis feedback current $i_d$, a constant number section 611q to multiply the multiplied result at the multiplying section 612q with the constant number (Ldn), a constant number section 613q to multiply the motor angular velocity ω with the constant number (φn), and an adding section 614q to add with the output of the constant number section 611q and the output of the constant number section 613q.

The d-axis disturbance compensation value $V_{cmp\_d}$ calculated at the d-axis disturbance estimating observer 600d is inputted into the adding section 122d and the q-axis disturbance compensation value $V_{cmp\_q}$ calculated at the q-axis disturbance estimating observer 600q is inputted into the adding section 122q. The voltage command value $V_{d2}$ from the adding section 122d is inputted into the adding section 123d and the voltage command value $V_{q2}$ from the adding section 122q is inputted into the adding section 123q. The dead time compensation value $V_d^*$ from the d-axis dead time compensating section 200d is also inputted into the adding section 123d and the dead time compensation $V_q^*$ from the q-axis dead time compensating section 200q is also inputted into the adding section 123q. The known dead time section may be used as the d-axis dead time compensating section 200d and the q-axis dead time compensating section 200q. It is preferable that the configuration of the dead time compensating section 200A (the first example), 200B (the second example), or 200C (the third example) described below is used as those of the d-axis dead time compensating section 200d and the q-axis dead time compensating section 200q.

The voltage command value $V_{d3}$ calculated at the adding section 123d is inputted into the subtracting section 124d and the subtracting section 124d subtracts the disturbance $V_{dis\_d}$ from the voltage command value $V_{d3}$. The voltage command value $V_{q3}$ calculated at the adding section 123q is inputted into the subtracting section 124q and the subtracting section 124q subtracts the disturbance $V_{dis\_q}$ from the voltage command value $V_{q3}$. The subtracted results at the subtracting sections 124d and 124q are inputted into the d-axis control object (the motor) $(1/(L_q \cdot s+Rd))$ and the q-axis control object (the motor) $(1/(L_q \cdot s+Rd))$, respectively. The disturbances $V_{dis\_d}$ and $V_{dis\_q}$ according to the present invention are related to the internal generated disturbance. Mainly, the back-EMF generated in the motor, the voltage distortion which is derived from the dead time and is generated in the ECU and the voltage which is prevented from the control voltage (the voltage except for controlling $(1/(L \cdot s+R))$) are expressed as the disturbance. That is, the disturbances $V_{dis\_d}$ and $V_{dis\_q}$ are the disturbance which is not compensated by the dq-axis non-interference control and the dead time compensation and includes the circuit constant, the variation of the motor characteristic, the aged deterioration and the temperature variation.

In a case that the d-axis armature voltage, the q-axis armature voltage, the d-axis armature winding resistance, the q-axis armature winding resistance, the velocity electromotive force induced in the q-axis, the self-inductance of the d-axis control object (the motor), the self-inductance of the q-axis control object (the motor) and the Laplace operator are set to $V_d$, $V_q$, $R_d$, $R_q$, φω (where "φ" is the interlink magnetic flux and "ω" is the motor angular velocity), $L_d$, $L_q$ and "s", respectively, the d-axis control object (the motor) is expressed as "$1/(L_d \cdot s + Rd)$", the q-axis control object (the motor) is expressed as "$1/(L_q \cdot s + Rd)$" and the d-axis armature voltage $V_d$ and the q-axis armature voltage $V_q$ are represented by the following Expression 1.

$$\begin{bmatrix} V_d \\ V_q \end{bmatrix} = \begin{bmatrix} R_d + L_d s & -\omega L_q \\ \omega L_d & R_q + L_q s \end{bmatrix} \begin{bmatrix} i_d \\ i_q \end{bmatrix} + \begin{bmatrix} 0 \\ \omega \phi \end{bmatrix} \quad \text{[Expression 1]}$$

Solving the Expression 1, the following Expression 2 is established.

$$V_d = (R_d + L_d s)i_d - \omega L_q i_q$$

$$V_q = (R_q + L_q s)i_q + \omega L_d i_d + \omega \phi \quad \text{[Expression 2]}$$

The first term of right-hand side of the d-axis armature voltage $V_d$ in the Expression 2 is an inverse function of the motor and the second term is a non-interference component. The first term of right-hand side of the q-axis armature voltage $V_q$ in the Expression 2 is the inverse function of the motor, the second term is the non-interference component and the third term is a back-EMF component.

In the disturbance estimating observer, the disturbance $V_{dis\_d}$ is estimated by calculating the difference between the voltage command value $V_{dis\_d}$ on the d-axis and the actual terminal voltage of the motor on the d-axis, and the disturbance $V_{dis\_q}$ is estimated by calculating the difference between the voltage command value $V_{dis\_q}$ on the q-axis and the actual terminal voltage of the motor on the q-axis. Nominal values of the armature winding resistance of the motor on the dq-axes are set to "$R_{dn}$" and "$R_{qn}$" and nominal values of the self-inductance on the dq-axes are set to "$L_{dn}$" and "$L_{qn}$". The disturbances $V_{dis\_d}$ and $V_{dis\_q}$ are estimated by using the above Expression 2 and then the following Expression 3 is obtained. In the Expression 3, "$V_{dis\_de0}$" and "$V_{dis\_qe0}$" denote the d-axis estimation disturbance voltage and the q-axis estimation disturbance voltage, respectively.

$$V_{dis\_de0} = v_{d2} - ((R_{dn} + L_{dn}s)i_d - \omega L_{qn}i_q)$$

$$V_{dis\_qe0} = v_{q2} - ((R_{qn} + L_{qn}s)i_q + \omega L_{dn}i_d + \omega \phi_n) \quad \text{[Expression 3]}$$

The above observer model of the motor includes not only the winding resistance and the self-inductance of the motor but also the non-interference component and the back-EMF component. Since the compensation loop of the disturbance estimating observer is a positive feedback from the command voltage to the command voltage, the time delay is occurred by inserting the LPF and then the stabilization of the compensation loop is devised. Another object of this LPF is to enhance the noise-resistance by performing the band limitation to the disturbance estimating observer. Considering the LPF (for example, the first-order characteristic "$1/(T \cdot s+1)$") in the above Expression 3, the following Expression 4 is established. In the Expression 4, "$V_{dis\_de}$" and "$V_{dis\_qe}$" denote the d-axis estimation disturbance voltage and the q-axis estimation disturbance voltage, respectively.

$$V_{dis\_de} = \left(\frac{1}{Ts+1}\right)v_{d2} - \left(\frac{1}{Ts+1}\right)((R_{dn} + L_{dn}s)i_d - \omega L_{qn}i_q) \quad \text{[Expression 4]}$$

$$V_{dis\_qe} = \left(\frac{1}{Ts+1}\right)v_{q2} - \left(\frac{1}{Ts+1}\right)((R_{qn} + L_{qn}s)i_q + \omega L_{dn}i_d + \omega \phi_n)$$

Figure 8:
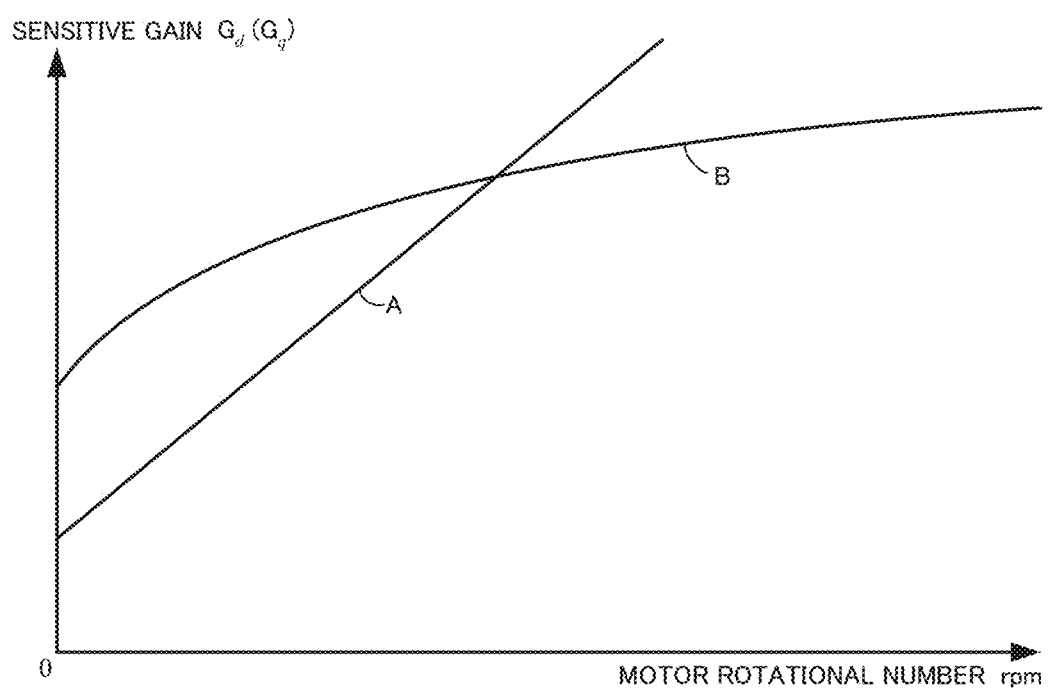
FIG. 8 is a characteristic diagram showing a characteristic example of a sensitive gain section.

In tuning on the actual apparatus, there exists a possibility that the compensation values of the disturbance estimating observer increase or decrease depending on the specific steering condition. In a case that the followability is needed, the sensitive gains become larger and in a case of steering holding in which the grip feeling is important, the sensitive gains become smaller. In the present invention, the characteristic of the sensitive gains is shown in FIG. 8 and the sensitive gains $G_d$ and $G_q$ of the sensitive gain sections 605$d$ and 605$q$ are variable depending on the motor rotational number rpm. The sensitive gains $G_d$ and $G_q$ can be set to a linear function whose input is the motor rotational number rpm (the characteristic "A" in FIG. 8) or be stored in the table (the characteristic "B" in FIG. 8). Thus, the dq-axes disturbance compensation values $V_{cmp\_d}$ and $V_{cmp\_q}$ are outputted in accordance with the following Expression 5. The estimated disturbance can temporarily become a larger value due to the influence of the noise or the like. In a case that the estimated disturbance values are set to the disturbance compensation values, it is possible that the over compensation is performed and the control system becomes unstable. Therefore, compensation amount limiting sections 604$d$ and 604$q$ are disposed at the subsequent stage of the sensitive gain section 605$d$ and 605$q$, respectively. The estimated disturbance which is beyond the limit value is judged as the irregular disturbance and the value which is limited is used as the compensation value.

Figure 9:
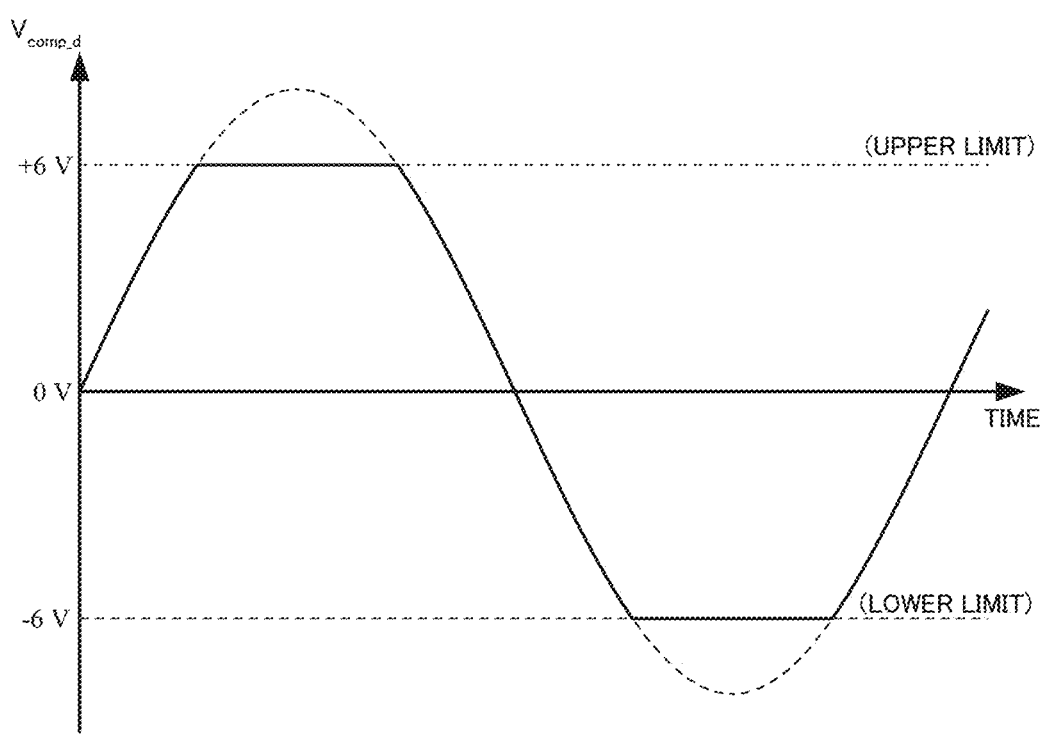
FIG. 9 is a characteristic diagram showing one example of a compensation amount limit value.

FIG. 9 shows a characteristic example of the compensation amount limiting section 604$d$ and in this example, the upper limit value is set to "+6 [V]" and the lower limit value is set to "−6 [V]". The upper limit value can be set in a range of "+6 [V]" to "+10 [V]" and the lower limit value can be set in a range of "−6 [V]" to "−10 [V]". The characteristic of the compensation amount limiting section 604$q$ is the same as or is similar to that of the compensation amount limiting section 604$d$.

$$V_{cmp\_d} = G_d \cdot V_{dis\_de}$$

$$V_{cmp\_q} = G_q \cdot V_{dis\_qe} \quad \text{[Expression 5]}$$

As shown in FIG. 7, the dead time compensation values $V_d^*$ and $V_q^*$ from the dead time compensating section 200 are added to the dq-axes control system, and the disturbance estimating observer 600$d$ and 600$q$ can estimate the disturbance except for the dead time or the disturbance which cannot be compensated by the dead time compensation (the disturbance such as the individual difference between the design value of the dead time compensation model and the ECU, the circuit constant, the variation of the motor characteristic, the aged deterioration and the temperature variation). The disturbance except for the dead time is represented by the following Expression 6 and the disturbance estimated by the present function becomes the estimation values to the disturbance in the Expression 6. In the Expression 6, "$V^*_{dis\_d}$" and "$V^*_{dis\_q}$" are the d-axis disturbance voltage in applying the dead time compensation and the q-axis disturbance voltage in applying the dead time compensation, respectively.

$$V^*_{dis\_d} = V_{dis\_d} - v^*_d$$

$$V^*_{dis\_q} = V_{dis\_q} - v^*_q \quad \text{[Expression 6]}$$

Next, the dead time compensating section 200 will be described. In the dead time compensating section 200, several examples are existed. In the first example (the dead time compensating section 200A) of FIG. 10, since the compensation sign and the compensation amount are automatically calculated, it has a characteristic that the chattering does not occur even in the low load and low speed steering region near the on-center of the handle, and the dead time compensation can be performed.

Figure 10:
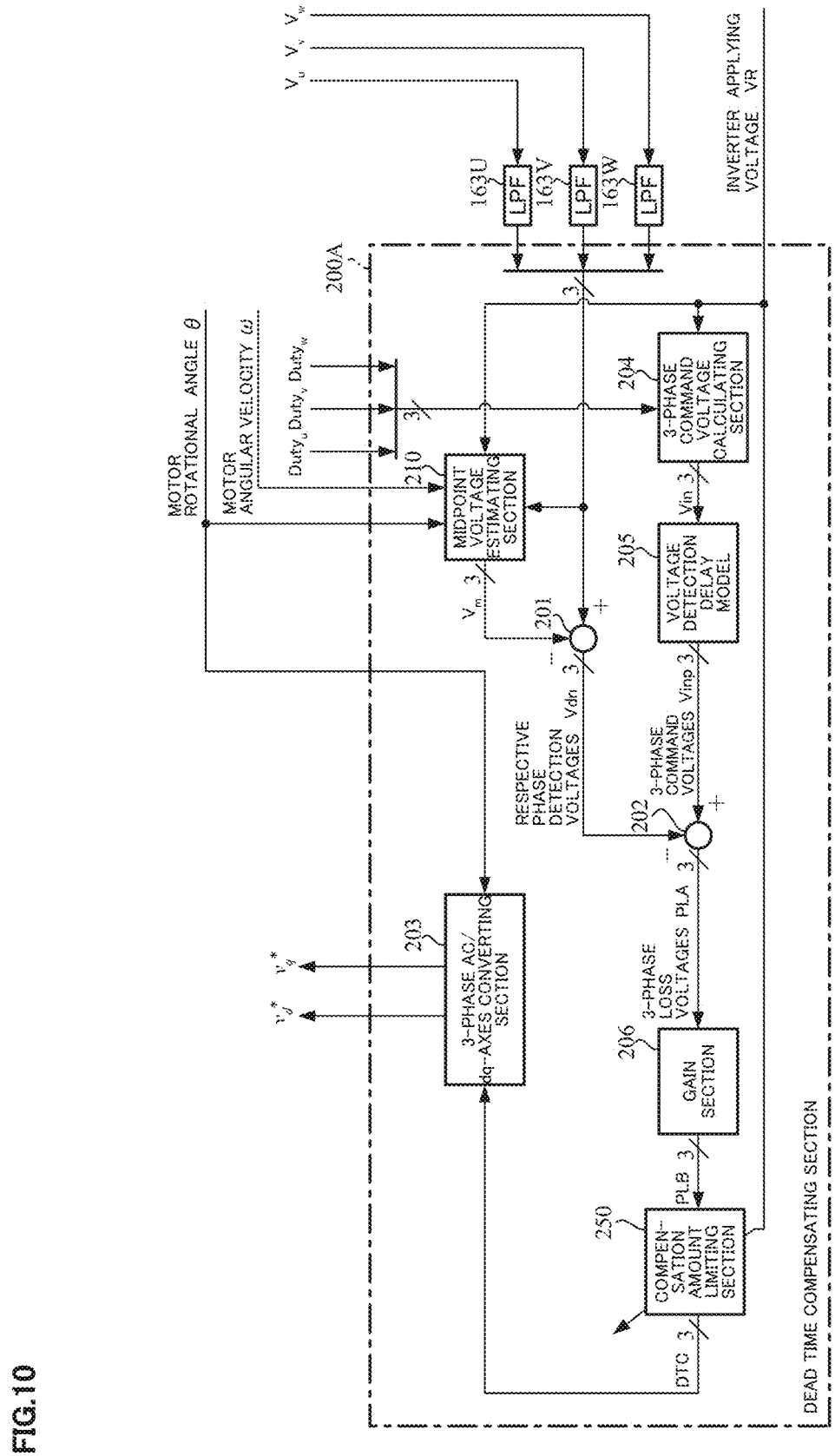
FIG. 10 is a block diagram showing a configuration example (the first example) of a dq-axes dead time compensating section.

As shown in FIG. 10, the dead time compensating section 200A comprises subtracting sections 201 (201U, 201V and 201W) and 202, a midpoint voltage estimating section 210, a 3-phase command voltage calculating section 204, a voltage detection delay model 205, a gain section 206, a compensation amount limiting section 250 and a 3-phase AC/dq-axes converting section 203.

Figure 11:
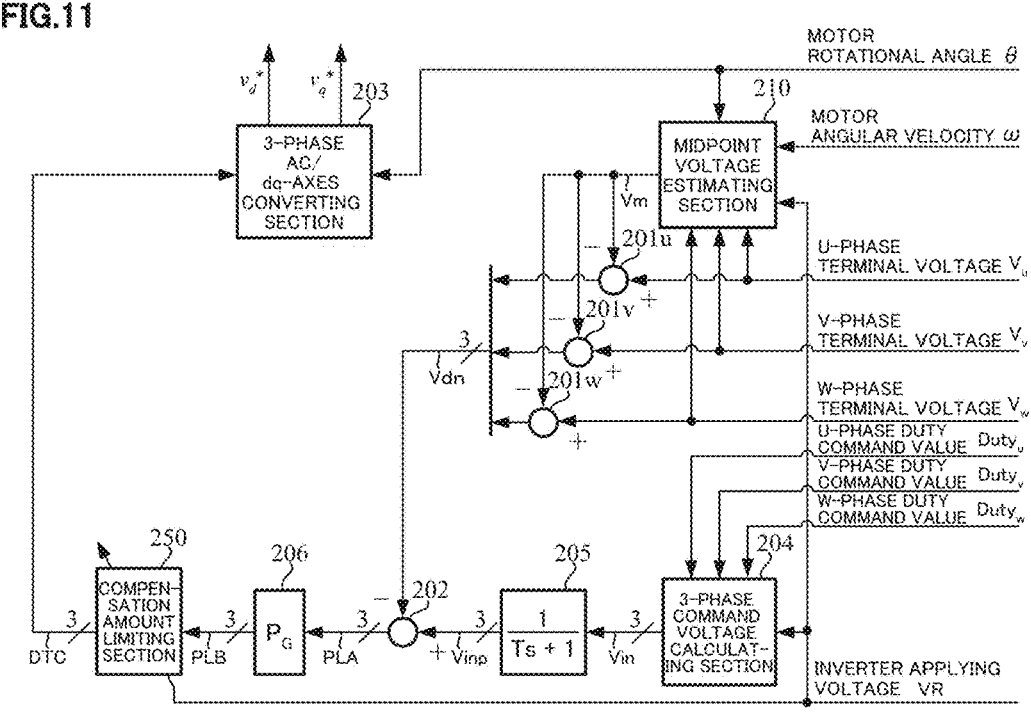
FIG. 11 is a detailed block diagram showing a configuration example (the first example) of the dq-axes dead time compensating section.

The detail configuration is shown in FIG. 11, the motor rotational angle θ is inputted into the midpoint voltage estimating section 210 and the 3-phase AC/dq-axes converting section 203, and the motor rotational velocity ω is inputted into the midpoint voltage estimating section 210. The motor terminal voltages $V_u$, $V_v$ and $V_w$ are inputted into the midpoint voltage estimating section 210 and the subtracting section 201 (201U, 201V and 201W) via LPFs 163U, 163V and 163W. Further, the duty values $Duty_u$, $Duty_v$ and $Duty_w$ from the duty command value calculating section (not shown) in the PWM-control section 160 are inputted into the 3-phase command voltage calculating section 204, and the inverter applying voltage VR is inputted into the midpoint voltage estimating section 210, the 3-phase command voltage calculating section 204 and the compensation amount limiting section 250. When the 3-phase signal lines are depicted in the drawings, the depicted lines are complicated. In FIGS. 10 and 11, the three-phase is expressed by depicting only the one-phase by the solid line and the oblique line and showing the number "3". The same applies to following other examples.

Figure 12:
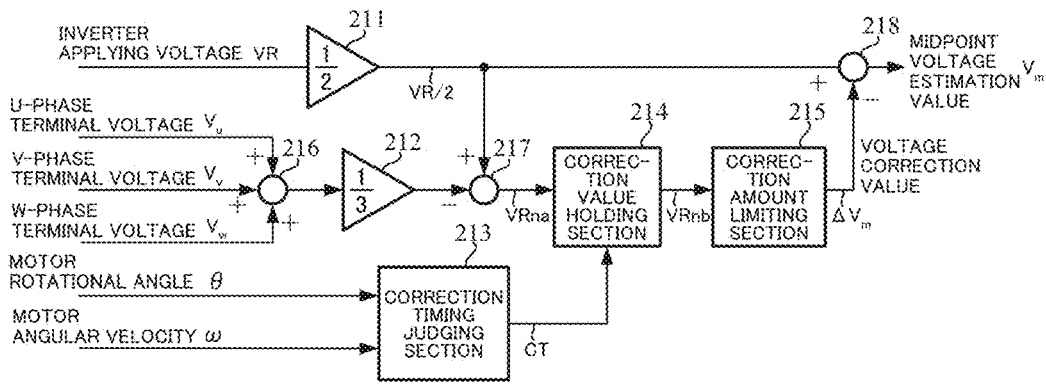
FIG. 12 is a block diagram showing a configuration example of a midpoint voltage estimating section.

The midpoint voltage estimating section 210 calculates a reference voltage of midpoint voltages by using the inverter applying voltage VR. The detail configuration is shown in FIG. 12, since the midpoint voltages vary depending on the influence of a hardware configuration, a detection error and so on, the correction is performed based on the differences between the inverter applying voltage VR and the motor terminal voltages $V_u$, $V_v$ and $V_w$. The correction timing is adjusted under conditions of a specific motor rotational angle θ and a specific motor angular velocity ω.

That is, the inverter applying voltage VR is reduced by half (VR/2) in a reducing section 211, and a half-reduced value (VR/2) is addition-inputted into subtracting sections 217 and 218. The motor terminal voltages $V_u$, $V_v$ and $V_w$ are inputted into the adding section 216 and are added, the added result "$V_u+V_v+V_w$" is ⅓-multiplied in a dividing section (⅓) 212, and a ⅓-multiplied voltage "$(V_u+V_v+V_w)/3$" is subtraction-inputted into the subtracting section 217. The subtracting section 217 subtracts the voltage "$(V_u+V_v+V_w)/3$" from the half-reduced value VR/2, and the subtracted result $VR_{na}$ is inputted into a correction value holding section 214. A correction timing judging section 213 judges a correction timing based on the motor rotational angle θ and the motor angular velocity ω and inputs a correction signal CT to the correction value holding section 214. The correction amount limiting section 215 calculates a voltage correction value $\Delta V_m$ based on a voltage $VR_{nb}$ held in the correction value holding section 214.

Figure 13:
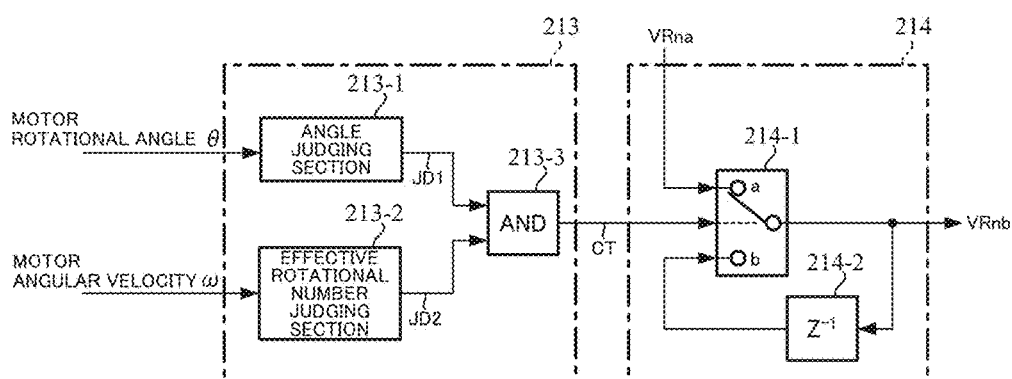
FIG. 13 is a block diagram showing a detailed example of a correction timing judging section and a correction value holding section.

The details of the correction timing judging section 213 and the correction value holding section 214 are shown in FIG. 13, the correction timing judging section 213 comprises an angle judging section 213-1, an effective rotational velocity judging section 213-2 and an AND-circuit 213-3, and the correction value holding section 214 comprises a switching section 214-1 and a holding unit ($Z^{-1}$) 214-2.

That is, the motor rotational angle θ is inputted into the angle judging section 213-1 and the judgment is performed by using the below Expression 7. When the Expression 7 is established, the angle judging section 213-1 outputs a judging signal JD1.

$$179 \text{ [deg]} < \theta < 180 \text{ [deg]} \qquad \text{[Expression 7]}$$

In a case that the timing of the above Expression 7 is considered as the correction condition on the calculation of the midpoint correction value, it is possible to accurately sample a voltage value of a zero-crossing point. Since the third harmonic is superimposed on the motor terminal voltages except for the above point, it is impossible to detect more accurate value. For example, considering that the respective terminal voltages detected by the condition of the Expression 7 are "$V_u$=6.83 [V], $V_v$=7.55 [V], $V_w$=5.94 [V]" and the motor applying voltage is "13.52 [V]", "$(V_u+V_v+V_w)/3$"=6.77 [V] and "VR/2=6.76 [V]" are established, and therefore "$VR/2 \cong (V_u+V_v+V_w)/3$", the almost midpoint voltage is obtained. Further, when the motor angular velocity ω is high, since the influence of the motor back-EMF increases and the sampling precision decreases, it is impossible to perform the accurate correction calculation. Thus, the effective rotational number judging section 213-2 judges whether the motor angular velocity ω is equal to or less than an effective angular velocity $\omega_0$ being capable of correction-calculating or not, by using the below Expression 8. When the motor angular velocity ω is equal to or less than the effective angular velocity $\omega_0$, the effective rotational number judging section 213-2 outputs the judging signal JD2.

$$\omega \leq \omega_0 \qquad \text{[Expression 8]}$$

The judging signals JD1 and JD2 are inputted into the AND-circuit 213-3, and the correction signal CT is outputted in accordance with the AND-condition that the judging signals JD1 and JD2 are inputted. The correction signal CT is inputted into the switching section 214-1 in the correction value holding section 214 as a switching signal and switches contact points "a" and "b". The subtracted result $VR_{na}$ is inputted into the contact point "a", and the output voltage $VR_{nb}$ is inputted into the contact point "b" via the holding unit ($Z^{-1}$) 214-2. The correction value holding section 214 holds a value in order to output a stable correction value till a next timing. Further, in a case that the correction amount is clearly larger than a normal value due to the noise, the back-EMF, the correction timing miss-judgment and so on, the correction amount limiting section 215 judges that the present correction amount is not right and limits to the maximum correction amount. The voltage correction value $\Delta V_m$ which is limited to the maximum correction amount is inputted into the subtracting section 218, and the midpoint voltage estimation value $V_m$ calculated in accordance with the following Expression 9 in the subtracting section 218 is outputted. The midpoint voltage estimation value $V_m$ is subtraction-inputted into the subtracting section 201 (201U, 201V and 201W).

$$V_m = \frac{VR}{2} - \Delta V_m \qquad \text{[Expression 9]}$$

Furthermore, the 3-phase duty command values $\text{Duty}_u$, $\text{Duty}_v$ and $\text{Duty}_w$ and the inverter applying voltage VR are inputted into the 3-phase command voltage calculating section 204, and the 3-phase command voltage calculating section 204 calculates the 3-phase command voltages $V_{in}$ by using the following Expression 10 in accordance with the 3-phase duty command values $\text{Duty}_u$, $\text{Duty}_v$ and $\text{Duty}_w$ and the inverter applying voltage VR. The 3-phase command voltages $V_{in}$ are inputted into the voltage detection delay model 205. As well, "$\text{Duty}_{ref}$" denotes $\text{Duty}_u$, $\text{Duty}_v$ and $\text{Duty}_w$, "$\text{Duty}_{50\%}$," denotes that the duty is "50%", and "$\text{Duty}_{100\%}$" denotes that the duty is "100%" in the Expression 10.

$$V_{in} = VR \times \frac{(\text{Duty}_{ref} - \text{Duty}_{50\%})}{\text{Duty}_{100\%}} \quad \text{[Expression 10]}$$

The midpoint estimation value $V_m$ is subtraction-inputted into the subtracting section 201 (201U, 201V and 201W), and further the terminal voltages $V_u$, $V_v$ and $V_w$ passed the LPFs 163U, 163V and 163W are addition-inputted into the subtracting section 201 (201U, 201V and 201W). The subtracting sections 201U, 201V and 201W subtract the midpoint estimation value $V_m$ from the 3-phase terminal voltages $V_u$, $V_v$ and $V_w$ in accordance with the following Expression 11. Thereby, 3-phase detection voltages $V_{dn}$ ($V_{du}$, $V_{dv}$ and $V_{dw}$) are obtained. The 3-phase detection voltages $V_{dn}$ ($V_{du}$, $V_{dv}$ and $V_{dw}$) are inputted into the subtracting section 202 serving as a 3-phase loss voltage calculating section.

$$V_{du} = V_u - V_m$$
$$V_{dv} = V_v - V_m$$
$$V_{dw} = V_w - V_m \quad \text{[Expression 11]}$$

The detection of the terminal voltages $V_u$, $V_v$ and $V_w$ has a delay due to a noise filter or the like in the ECU. Consequently, in a case that the loss voltages are directly calculated by obtaining the differences between the 3-phase command value voltages $V_{in}$ and the 3-phase detection voltages $V_{dn}$, the error occurs due to the phase difference. In order to resolve this problem, the present example approximates the detection delay of the hardware such as a filter circuit as the first order filter model and improves the phase difference. The voltage detection delay model 205 of the present example is a primary filter of the following Expression 12 and "T" denotes a filter time constant. The voltage detection delay model 205 may be a model of a secondary filter or higher order filter.

$$\frac{1}{Ts+1} \quad \text{[Expression 12]}$$

The 3-phase correction command voltages $V_{inp}$ from the voltage detection delay model 205 are addition-inputted into the subtracting section 202, and the 3-phase detection voltages $V_{dn}$ are subtraction-inputted into the subtracting section 202. The 3-phase loss voltages PLA ($V_{loss\_n}$) are calculated by subtracting the 3-phase detection voltages $V_{dn}$ from the 3-phase correction command voltages $V_{inp}$. That is, the subtracting section 202 performs the following Expression 13.

$$V_{loss\_u} = V_{inu} - V_{du}$$
$$V_{loss\_v} = V_{inv} - V_{dv}$$
$$V_{loss\_w} = V_{inw} - V_{dw} \quad \text{[Expression 13]}$$

The 3-phase loss voltages PLA ($V_{loss\_n}$) are multiplied with a gain $P_G$ (for example, "0.8") in the gain section 206, and the 3-phase loss voltages PLB which is multiplied the 3-phase loss voltages PLA ($V_{loss\_n}$) with the gain $P_G$ are inputted into the compensation amount limiting section 250. Although the gain $P_G$ is not basically needed to adjust, the gain $P_G$ is changed in a case that an output adjustment is needed when the adjustment for another compensators or actual vehicle tuning is required, or parts of the ECU are changed.

Figure 14:
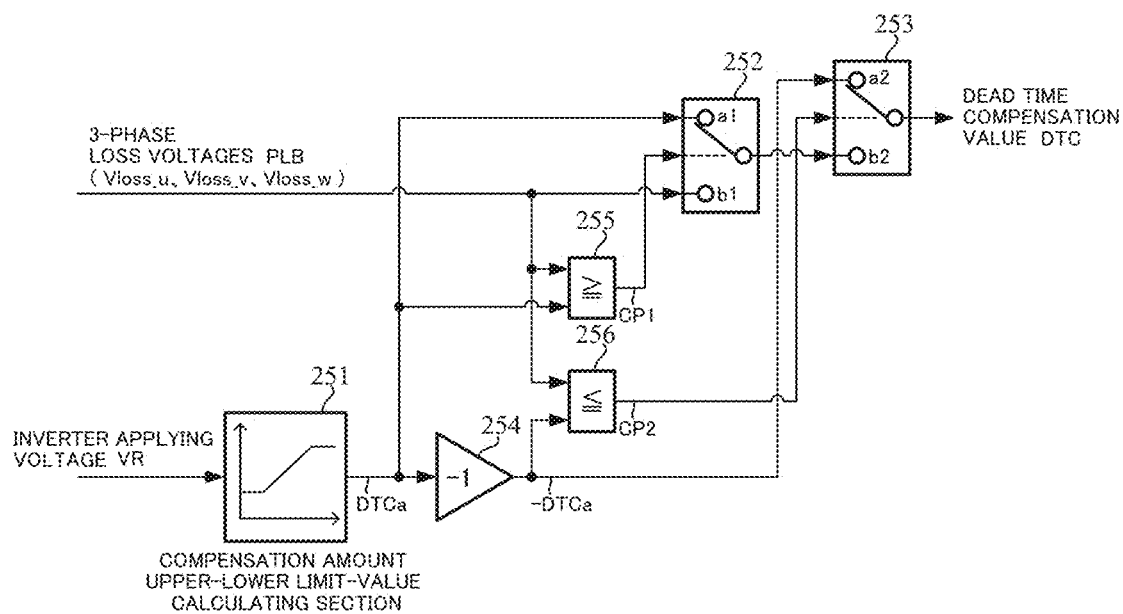
FIG. 14 is a block diagram showing a configuration example of a compensation amount limiting section.
Figure 15:
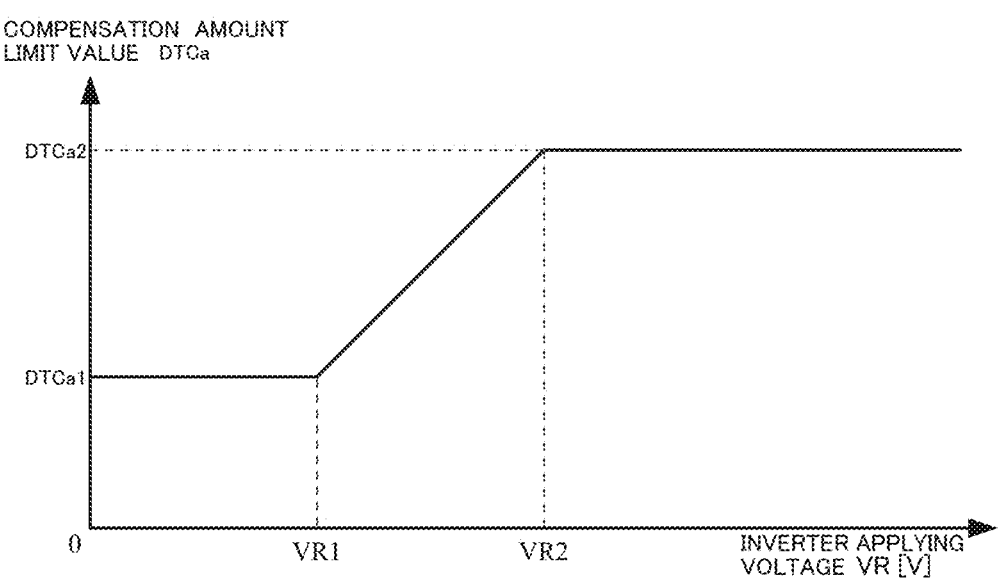
FIG. 15 is a characteristic diagram showing one example of the compensation amount limit value.

The compensation amount limiting section 250 is sensitive to the inverter applying voltage VR, and the detail configuration is shown in FIG. 14. The inverter applying voltage VR is inputted into a compensation upper-lower limit-value calculating section 251 in the compensation amount limiting section 250, and a compensation amount limit value DTCa is calculated with a characteristic as shown in FIG. 15. The compensation amount limit value DTCa is a constant limit value DICa1 when the inverter applying voltage VR is lower than a predetermined voltage VR1, linearly (or non-linearly) increases when the inverter applying voltage VR is equal to or higher than the predetermined voltage VR1 and is lower than a predetermined voltage VR2 (>VR1), and holds a constant limit value DTCa2 when the inverter applying voltage VR is equal to or higher than the predetermined voltage VR2. The compensation amount limit value DTCa is inputted into a contact point a1 of the switching section 252, a comparing section 255 and an inverting section 254. Further, the 3-phase loss voltages PLB ($V_{loss\_u}$, $V_{loss\_v}$, $V_{loss\_w}$) are inputted into comparing sections 255 and 256, and a contact point b1 of the switching section 252. An output "−DTCa" of the inverting section 254 is inputted into a contact point a2 of the switching section 253. The contact points a1 and b1 are switched based on a comparison result CP1 of the comparing section 255, and the contact points a2 and b2 are switched based on a comparison result CP2 of the comparing section 256.

The comparing section 255 compares the compensation amount limit value DTCa with the 3-phase loss voltages PLB and switches the contact points a1 and b1 of the switching section 252 in accordance with the following Expression 14. Further, the comparing section 256 compares the compensation amount limit value "−DTCa" with the 3-phase loss voltages PLB and switches the contact points a2 and b2 of the switching section 253 in accordance with the following Expression 15.

[Expression 14]

When the 3-phase loss voltages PLB≥the compensation amount upper-limit value (DTCa), the contact point a1 of the switching section 252 is "ON" (the contact point b2 of the switching section 253=DTCa).

When the 3-phase loss voltages PLB<the compensation amount upper-limit value (DTCa), the contact point b1 of the switching section 252 is "ON" (the contact point b2 of the switching section 253=the 3-phase loss voltages PLB).

[Expression 15]

When the 3-phase loss voltages PLB the compensation amount lower-limit value (−DTCa), the contact point a2 of the switching section 253 is "ON" (the dead time compensation value DTC=−DTCa).

When the 3-phase loss voltages PLB>the compensation amount lower-limit value (−DTCa), the contact point b2 of the switching section 253 is "ON" (the dead time compensation value DTC=the output of the switching section 252).

Next, the second example in the dead time compensating section 200 shown in FIG. 16 will be described corresponding to FIG. 10. The second example (the dead time compensating section 200B) shown in FIG. 16 has a high compensation accuracy in both the low speed steering region and the middle speed steering region that the angle is coincident with the phase of the phase current.

Figure 1:
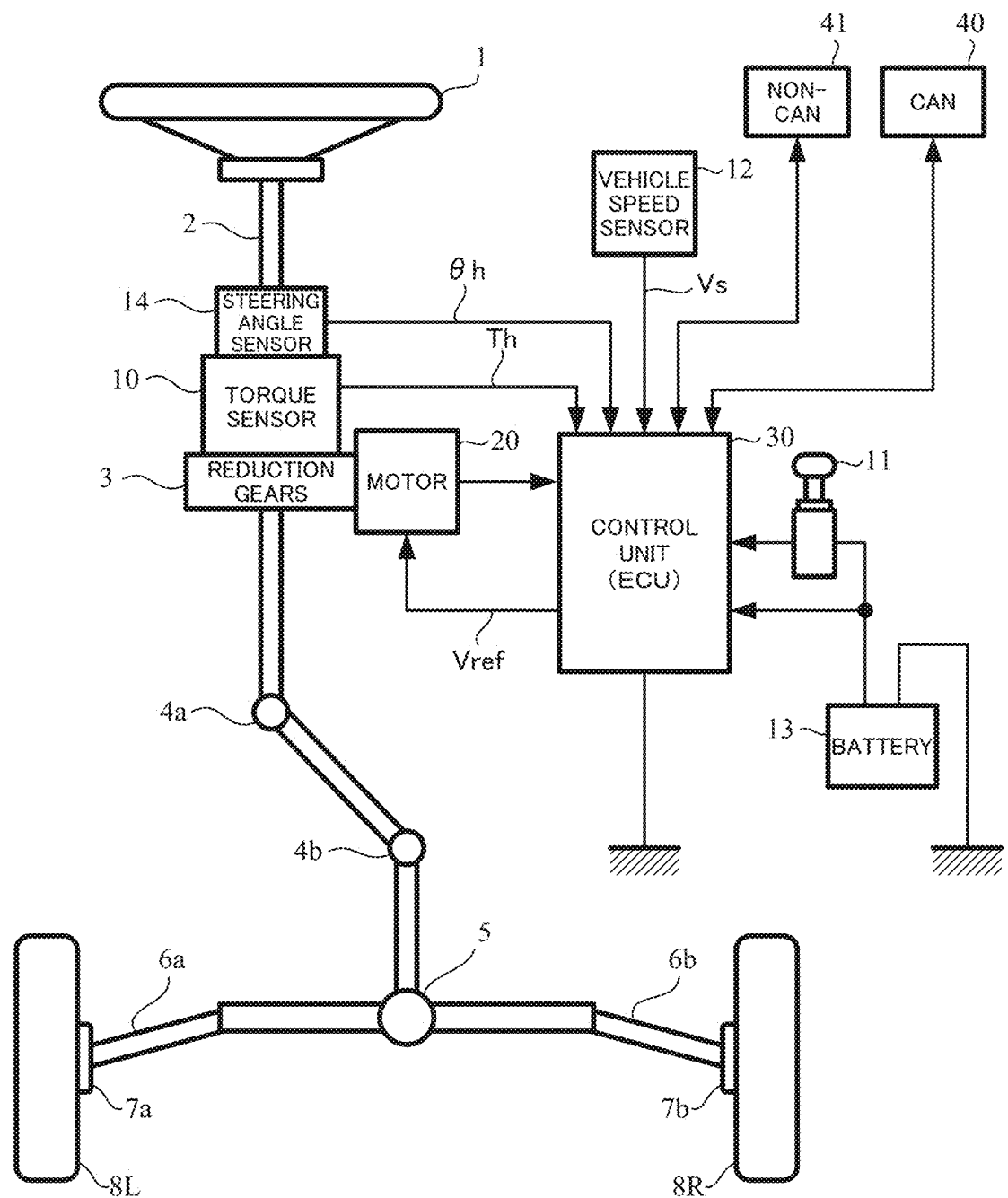
FIG. 1 is a configuration diagram showing a general outline of an electric power steering apparatus.
Figure 2:
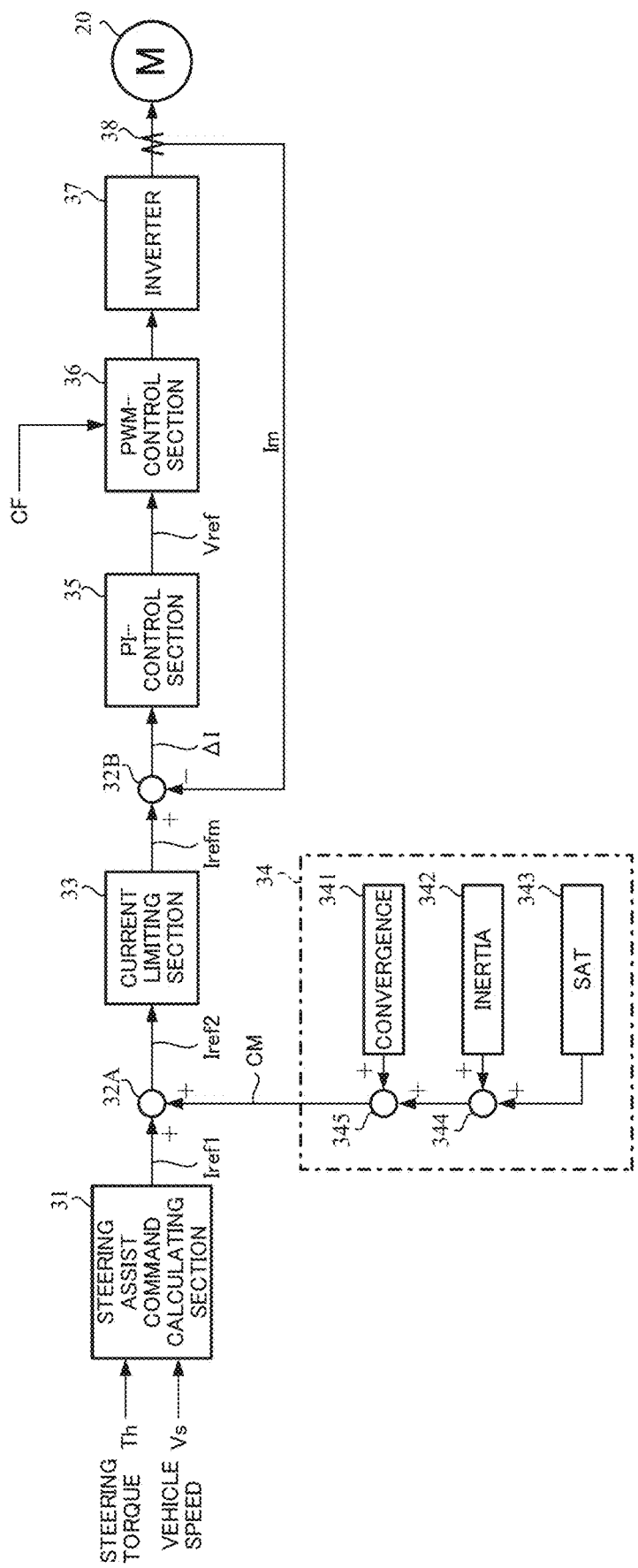
FIG. 2 is a block diagram showing a configuration example of a control unit (ECU) of the electric power steering apparatus.

The q-axis steering assist command value $i_{qref}$ corresponding to the steering assist command value $I_{ref2}$ shown in FIG. 2, the motor rotational angle θ and the motor angular velocity ω are inputted into the dead time compensating section 200B of the present example. The dead time compensating section 200B comprises a current control delay model 208, a compensation sign estimating section 209, multiplying sections 232, 233d and 233q, an adding section 221, a phase adjusting section 207, an inverter applying voltage sensitive-gain calculating section 220, an angle-dead time (DT) compensation value functional sections 230U, 230V and 230W, multiplying sections 231U, 231V and 231W, a 3-phase AC/dq-axes converting section 203 and a current command value sensitive-gain section 240.

Figure 17:
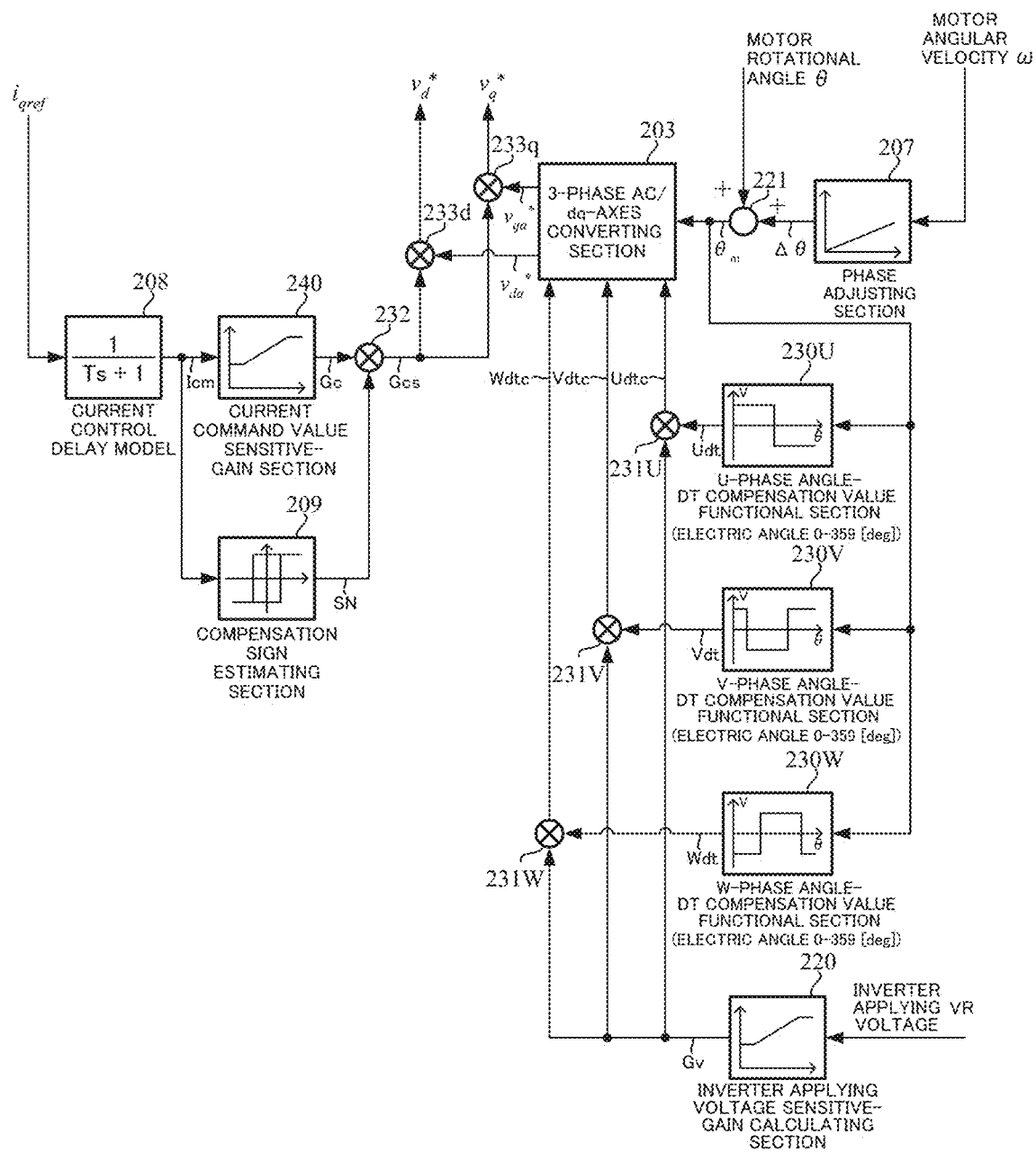
FIG. 17 is a detailed block diagram showing a configuration example (the second example) of the dq-axes dead time compensating section.

The detailed configuration of the dead time compensating section 200B is shown in FIG. 17 and the q-axis steering assist command value $i_{qref}$ is inputted into the current control delay model 208. The delay due to the noise filter or the like in the ECU is occurred until the current command values $i_d^*$ and $i_q^*$ on the dq-axes are reflected to the actual current. Therefore, when the sign is directly judged from the current command value $i_q^*$, there exists the timing deviation. In order to resolve this problem, the present example approximates the delay of the overall current control as the first order filter model and improves the phase difference. The current control delay model 208 of the present example is a primary filter of the following Expression 16 and "T" denotes a filter time constant.

$$\frac{1}{Ts+1} \qquad \text{[Expression 16]}$$

The current command value $I_{cm}$ outputted from the current control delay model 208 is inputted into the current command value sensitive-gain section 240 and the compensation sign estimating section 209. In a low current region, a case that the dead time compensation amount is overcompensated is occurred. The current command value sensitive-gain section 240 has a function that a gain, which the compensation amount is reduced depending on the magnitude of the current command value $I_{cm}$ (the steering-assist command value $i_{qref}$), is calculated. In order that the gain, which the compensation amount is reduced, is not largely changed due to a noise from the current command value $I_{cm}$ (the steering-assist command value $i_{qref}$), or the like, a noise reduction process is performed by using a weighted average filter.

Figure 18:
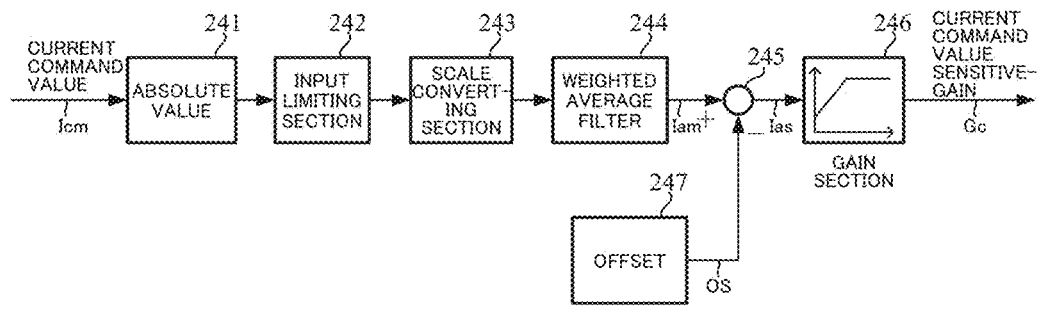
FIG. 18 is a block diagram showing a configuration example of a current command value sensitive-gain section.
Figure 19:
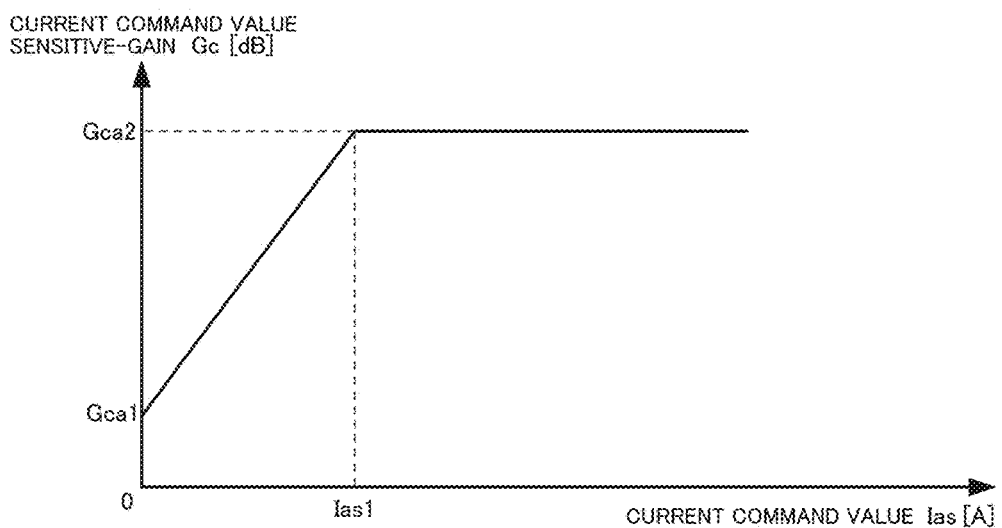
FIG. 19 is a characteristic diagram of a gain section in the current command value sensitive-gain section.

The current command value sensitive-gain section 240 has a configuration shown in FIG. 18. An absolute value $|I_{cm}|$ of the current command value $I_{cm}$ is calculated at an absolute value section 241. The absolute value $|I_{cm}|$ of the current command value $I_{cm}$ whose maximum value is limited at an input limiting section 242 is inputted into a weighted average filter 244 via a scale converting section 243. The current command value $I_{am}$ that the noise is reduced at the weighted average filter 244 is addition-inputted into a subtracting section 245, and a predetermined offset OS is subtracted from the current command value $I_{am}$ at the subtracting section 255. The reason for subtracting the offset OS is to prevent a chattering due to a minute current command value, and the input value that is equal to or smaller than the offset OS is fixed to the minimum gain. The offset OS is a constant value. The current command value $I_{as}$ that the offset OS is subtracted at the subtracting section 245 is inputted into a gain section 246, and the current command value sensitive-gain $G_c$ is outputted in accordance with a gain characteristic as shown in FIG. 19. That is, the initial value of the current command value sensitive gain $G_c$ at the gain section 246 is "$G_{ca1}$", and the current command value sensitive-gain $G_c$ linearly increases when the current command value $I_{as}$ is equal to or smaller than a predetermined value $I_{as1}$, and holds a constant value $G_{ca2}$ when the current command value $I_{as}$ is larger than the predetermined value $I_{as1}$.

Figure 20:
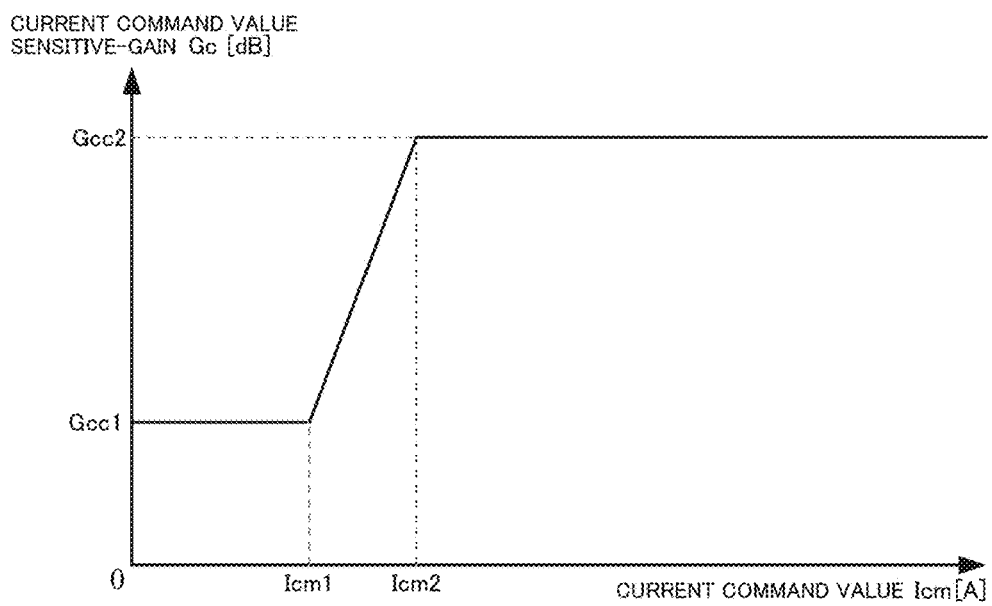
FIG. 20 is a characteristic diagram showing a characteristic example of the current command value sensitive-gain section.

The current command value sensitive-gain $G_c$ outputted from the current command value sensitive-gain section 240 has a characteristic, for example, as shown in FIG. 20, to the inputted current command value $I_{cm}$. That is, the current command value sensitive-gain $G_c$ is a constant gain $G_{cc1}$ when the current command value $I_{cm}$ is smaller than a predetermined current $I_{cm1}$, linearly (or nonlinearly) increases when the current command value $I_{cm}$ is equal to or larger than the predetermined current $I_{cm1}$ and is smaller than a predetermined current $I_{cm2}$ ($>I_{cm}$), and holds a constant gain $G_{cc2}$ when the current command value $I_{cm}$ is equal to or larger than the predetermined current $I_{cm2}$.

The compensation sign estimating section 209 outputs a compensation sign SN, which has a positive value (+1) or a negative value (−1) and indicates a hysteresis characteristic shown in FIGS. 21A and 21B, against the inputted current command value $I_{cm}$. The compensation sign SN is estimated based on zero-crossing points of the current command value $I_{cm}$ as a reference. In order to suppress the chattering, the compensation sign SN has the hysteresis characteristic. The estimated compensation sign SN is inputted into the multiplying section 232. In a case that the sign of the dead time compensation value is simply determined from the current sign of the phase current command value model, the chattering is occurred in the low load. When the handle is slightly steered to the left or the right near the on-center, the torque ripple is occurred. In order to improve this problem, the hysteresis is adopted in the sign judgement. The current sign is held except for a case that the sign is changed beyond the set current value, and the chattering is suppressed.

The current command value sensitive-gain $G_c$ from the current command value sensitive-gain section 240 is inputted into the multiplying section 232. The multiplying section 232 outputs the current command value sensitive-gain $G_{cs}$ (=$G_c \times$SN) that the compensation sign SN is multiplied with the current command value sensitive-gain $G_c$. The current command value sensitive-gain $G_{cs}$ is inputted into the multiplying sections 233d and 233q.

Because the optimal dead time compensation amount varies depending on the inverter applying voltage VR, in the present example, the voltage sensitive gain $G_v$ is calculated depending on the inverter applying voltage VR and the dead time compensation amount can be variable. The configuration of the inverter applying voltage sensitive-gain calculating section 220 to output the voltage sensitive gain $G_v$ by inputting the inverter applying voltage VR is shown in FIG.

22. An absolute value of the maximum value of the inverter applying voltage VR is limited in an input limiting section 221 and the limited inverter applying voltage $VR_{nx}$ is inputted into an inverter applying voltage/dead time compensation-gain conversion table 222. The characteristic of the inverter applying voltage/dead time compensation-gain conversion table 222 is shown, for example, in FIG. 23. That is, the inverter applying voltage/dead time compensation-gain conversion table 222 has a characteristic that the voltage sensitive gain $G_v$ is a constant gain (=0.7) when the inverter applying voltage VR is lower than the first predetermined voltage 9.0 [V], linearly (or nonlinearly) increases when the inverter applying voltage VR is equal to or higher than the first predetermined voltage 9.0 [V] and is lower than the second predetermined voltage 15.0 [V] and holds a constant gain (=1.2) when the inverter applying voltage VR is equal to or higher than the second predetermined voltage 15.0 [V]. The inverter applying voltages 9.0[V] and 15.0[V] of inflection points and the voltage sensitive gains "0.7" and "1.2" are presented as examples and are appropriately variable. The calculated voltage sensitive gain $G_v$ is inputted into the multiplying sections 231U, 231V and 231W.

Figure 24:
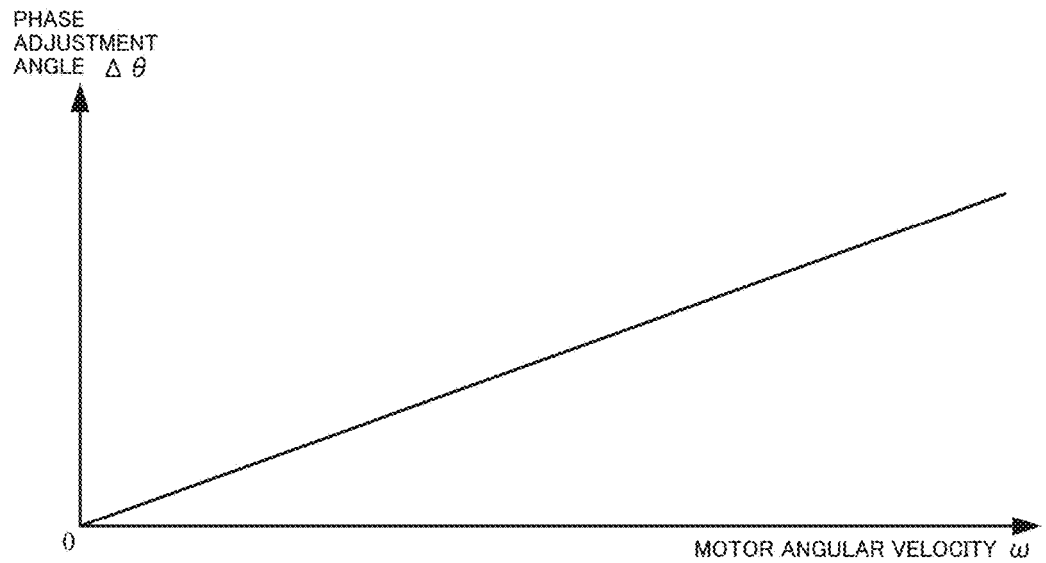
FIG. 24 is a characteristic diagram showing a characteristic example of a phase adjusting section.

In a case that the dead time compensation timing is hastened or is delayed in response to the motor angular velocity ω, the dead time compensating section 200B comprises the phase adjusting section 207 which has a function to calculate the adjustment angle depending on the motor angular velocity ω. The phase adjusting section 207 has a characteristic as shown in FIG. 24 in a case of a lead angle control. The calculated phase adjustment angle Δθ is inputted into the adding section 221 and is added to the detected motor rotational angle θ. The motor rotational angle $θ_m$ (=θ+Δθ) that is an added result of the adding section 421 is inputted into the angle-dead time (DT) compensation value functional sections 230U, 230V and 230W, and the 3-phase AC/dq-axes converting section 240.

After detecting a motor electric angle and calculating the duty command values, a time delay whose time is several tens of microseconds to one hundred microseconds is existed until actually correcting the PWM-signals. Since the motor is rotating during the delay time, a phase deviation between the motor electric angle in calculation and the motor electric angle in correction is generated. In order to compensate this phase deviation, the lead angle is performed depending on the motor angular velocity ω and the phase is adjusted.

Figure 25:
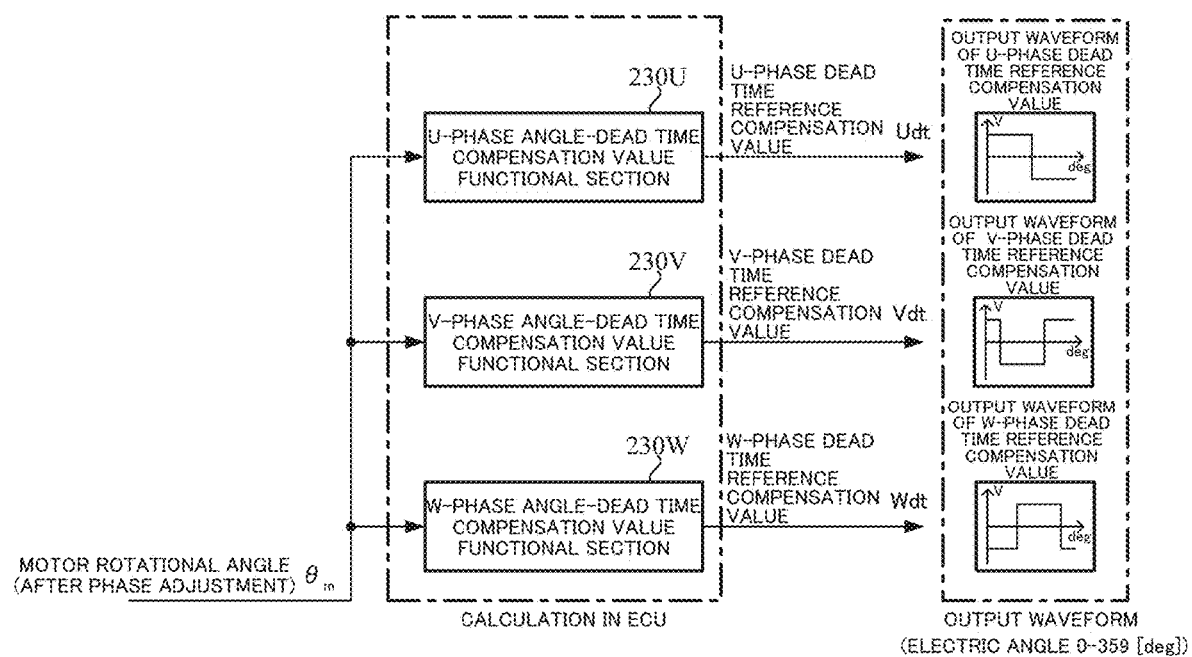
FIG. 25 is a diagram showing an operation example of a respective angle-dead time compensation value functional section.

The angle-dead time (DT) compensation value functional sections 230U, 230V and 230W, as shown in FIG. 25 in detail, respectively output respective phase rectangular wave dead time reference compensation values $U_{dt}$, $V_{dt}$ and $W_{dt}$ whose phases are shifted each other by 120 [deg] in a range of 0 to 359 [deg] in the electric angle, to the phase-adjusted motor rotational angle $θ_m$. The angle-dead time (DT) compensation value functional sections 230U, 230V and 230W treat the dead time compensation values, which are needed in the three-phases, as functions depending on the angle, calculates the dead time compensation values in the actual time of the ECU, and outputs the 3-phase dead time reference compensation values $U_{dt}$, $V_{dt}$ and $W_{dt}$. The angle functions of the dead time reference compensation values are different depending on the characteristic of the dead time in the ECU.

The dead time compensation values $U_{dt}$, $V_{dt}$ and $W_{dt}$ are respectively inputted into multiplying sections 231U, 231V and 231W, and are multiplied with the voltage sensitive gain $G_v$. The 3-phase dead time compensation values $U_{dtc}$ (=$G_v·U_{dt}$), $V_{dtc}$ (=$G_v·V_{dt}$) and $W_{dtc}$ (=$G_v·W_{dt}$) which are multiplied with the voltage sensitive gain $G_v$ are inputted into the 3-phase AC/dq-axes converting section 203. The 3-phase AC/dq-axes converting section 203 converts the 3-phase dead time compensation values $U_{dtc}$, $V_{dtc}$ and $W_{dtc}$ into the 2-phase dq-axes dead time compensation values $v_{da}*$ and $v_{qa}*$, synchronized with the motor rotational angle $θ_m$. The 2-phase dq-axes dead time compensation values $v_{da}*$ and $v_{qa}*$ are respectively inputted into the multiplying sections 233d and 233q, and are multiplied with the current command value sensitive-gain $G_{cs}$. The multiplied results in the multiplying sections 233d and 233q are the dead time compensation value $v_d*$ and $v_q*$. The dead time compensation value $v_d*$ and $v_q*$ are respectively added to the voltage command values $v_{d2}$ and $v_{d2}$ at the adding sections 123d and 123q.

Next, the third example in the dead time compensating section 200 shown in FIG. 26 will be described corresponding to FIGS. 10 and 16. The third example (the dead time compensating section 200C) shown in FIG. 26 has a characteristic that the compensation can simply be performed even in the high speed steering region.

The dead time compensating section 200C comprises an adding section 273, a multiplying section 272, an inverter applying voltage-sensitive compensation-amount calculating section 260, a 3-phase current command value model 270, a phase current compensation-sign estimating section 271, the phase adjusting section 207 and the 3-phase AC/dq-axes converting section 203. The motor rotational angle θ is inputted into the adding section 273 and the motor angular velocity ω is inputted into the phase adjusting section 207. The inverter applying voltage VR is inputted into the inverter applying voltage-sensitive compensation-amount calculating section 260. A motor rotational angle θ that is calculated and is phase-adjusted at the adding section 273 is inputted into the 3-phase current command value model 270.

In a case that the dead time compensation timing is hastened or is delayed in response to the motor angular velocity ω, the dead time compensation section 200C comprises the phase adjusting section 207 which has a function to calculate the adjustment angle depending on the motor angular velocity ω. The phase adjusting section 207 has a similar characteristic as shown in FIG. 24 in a case of the lead angle control. The calculated phase adjustment angle Δθ is inputted into the adding section 273 and is added to the motor rotational angle θ. The phase-adjusted motor rotational angle $θ_m$ (=θ+Δθ) that is an added result of the adding section 273 is inputted into the 3-phase current command value model 270 and the 3-phase AC/dq-axes converting section 203. The reason why the phase adjusting section 207 is disposed is the same as that in a case of the second example.

Figure 27:
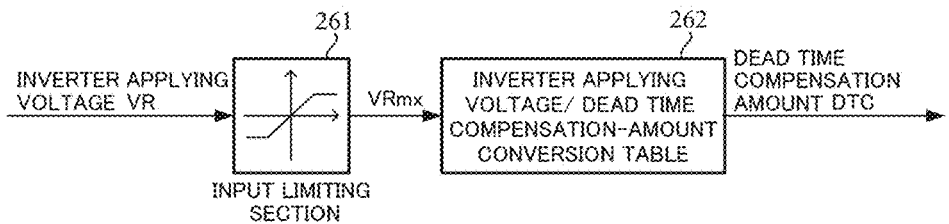
FIG. 27 is a block diagram showing a configuration example of an inverter applying voltage-sensitive compensation-amount calculating section.

Because the optimal dead time compensation amount is changed depending on the inverter applying voltage VR, the dead time compensation amount DTC is calculated depending on the inverter applying voltage VR and is variable in the present example. The inverter applying voltage-sensitive compensation-amount calculating section 260 that inputs the inverter applying voltage VR and outputs the dead time compensation amount DTC has a configuration as shown in FIG. 27. The maximum value of the absolute value of the inverter applying voltage VR is limited at an input limiting section 261. The inverter applying voltage $VR_{mx}$ whose maximum value is limited is inputted into an inverter applying voltage/dead time compensation-amount conversion table 262.

Figure 28:
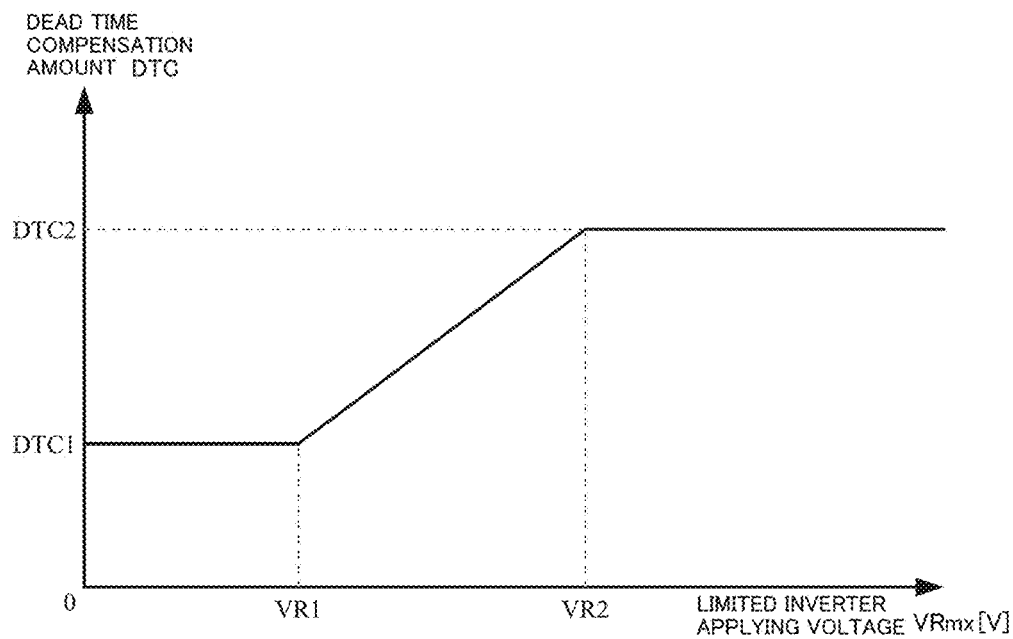
FIG. 28 is a characteristic diagram showing a characteristic example of the inverter applying voltage-sensitive compensation-amount calculating section.

The inverter applying voltage/dead time compensation-amount conversion table 262 has a characteristic, for example, as shown in FIG. 28. That is, the outputted dead time compensation amount DTC is a constant dead time compensation amount DTC1 when the inverter applying voltage $VR_{mx}$ whose maximum value is limited is lower than the first predetermined inverter applying voltage VR1, linearly (or nonlinearly) increases when the inverter applying voltage $VR_{mx}$ is equal to or higher than the predetermined voltage VR1 and is lower than the second predetermined voltage VR2 (>VR1) and is a constant dead time compensation amount DTC2 when the inverter applying voltage $VR_{mx}$ is equal to or higher than the second predetermined voltage VR2.

Figure 29:
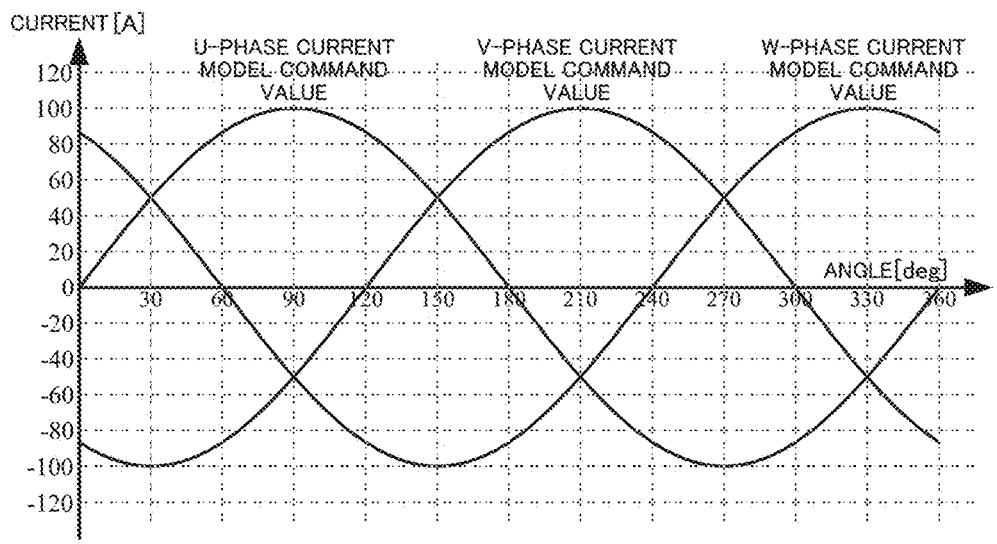
FIG. 29 is a waveform chart showing one example of an output waveform of a 3-phase current command value model.

The d-axis current command value $i_d^*$, the q-axis current command value $i_q^*$ and the motor rotational angle $\theta_m$ are inputted into the 3-phase current command value model 270. The 3-phase current command value model 270 calculates the sinusoidal 3-phase current model command values $I_{cma}$ whose phases are shifted each other by 120 [deg] as shown in FIG. 29, from the dq-axes current command values $i_d^*$ and $i_d^*$ and the motor rotational angle $\theta_m$ by calculation or using a table (refer to the following Expressions 17 to 18). The 3-phase current model command values $I_{cma}$ are different depending on the motor type. The d-axis current command value $i_{ref\_d}$ and the q-axis current command value $i_{ref\_q}$ are converted into the 3-phase current command values (U-phase, V-phase and W-phase) using the motor electric angle $\theta_e$. The above relationship is represented by the below Expression 17.

$$\begin{bmatrix} i_{ref\_u} \\ i_{ref\_v} \\ i_{ref\_w} \end{bmatrix} = \begin{bmatrix} \cos(\theta_e) & \sin(\theta_e) \\ \cos\left(\theta_e - \frac{2}{3}\pi\right) & \sin\left(\theta_e - \frac{2}{3}\pi\right) \\ \cos\left(\theta_e + \frac{2}{3}\pi\right) & \sin\left(\theta_e + \frac{2}{3}\pi\right) \end{bmatrix} \begin{bmatrix} i_{ref\_d} \\ i_{ref\_q} \end{bmatrix}$$ [Exprssion 17]

The respective phase current command values are calculated from the above Expression 17, and the U-phase current command value model $i_{ref\_u}$, the V-phase current command value model $i_{ref\_v}$ and the W-phase current command value model $i_{ref\_w}$ ware represented by the below Expression 18.

$i_{ref\_u} = i_{ref\_d} \cdot \cos(\theta_e) + i_{ref\_q} \cdot \sin(\theta_e)$ $i_{ref\_v} = i_{ref\_d} \cdot \cos(\theta_e - 2/3\pi) + i_{ref\_q} \cdot \sin(\theta_e - 2/3\pi)$ $i_{ref\_w} = i_{ref\_d} \cdot \cos(\theta_e + 2/3\pi) + i_{ref\_q} \cdot \sin(\theta_e + 2/3\pi)$ [Expression 18]

The table may be stored in an electrically erasable and programmable read-only memory (EEPROM) or may be loaded to a random access memory (RAM). In using the above Expression 18, the values of $\sin \theta_e$ are stored in the table. The values of $\cos \theta_e$ may be calculated by offsetting the input $\theta_e$ to 90° and other sine function terms may be calculated by offsetting the input $\theta_e$ to 120°. In a case that the capacity of the ROM is sufficiently large or the command value model is complicated (for example, a pseudo rectangular wave motor), all of the values of the Expression 18 are stored in the table.

The 3-phase current model command values $I_{cma}$ from the 3-phase current command value model 270 are inputted into the phase current compensation-sign estimating section 271. The phase current compensation-sign estimating section 271 outputs compensation signs SN, which have a positive value (+1) or a negative value (−1) and indicates a hysteresis characteristic shown in FIGS. 21A and 21B, against the inputted 3-phase current model command values $I_{cma}$. The compensation signs SN are estimated based on zero-crossing points of the 3-phase current model command values $I_{cma}$ as a reference. In order to suppress the chattering, the compensation signs SN have the hysteresis characteristic. The estimated compensation signs SN are inputted into the multiplying section 272. In a case that the signs of the dead time compensation values are simply determined from the current signs of the phase current command value model, the chattering is occurred in the low load. For example, when the handle is slightly steered to the left or the right near the on-center, the torque ripple is occurred. In order to improve this problem, the hysteresis is adopted in the sign judgement (±0.25 [A] in FIGS. 21A and 21B). The present signs are held except for a case that the signs are changed beyond the set current value, and the chattering is suppressed.

The dead time compensation amount DTC from the inverter applying voltage-sensitive compensation-amount calculating section 260 is inputted into the multiplying section 272. The multiplying section 272 outputs the dead time compensation amounts DTCa (=DTC×SN) that the compensation signs SN are multiplied with the dead time compensation amount DTC. The dead time compensation amounts DTCa are inputted into the 3-phase AC/dq-axes converting section 203. The 3-phase AC/dq-axes converting section 203 outputs the 2-phase dead time compensation values $v_d^*$ and $v_d^*$ in synchronization with the motor rotational angle $\theta_m$. The dead time compensation values $v_d^*$ and $v_d^*$ are added to the voltage command values $v_{d2}$ and $v_{d2}$ at the adding sections 123$d$ and 123$q$, respectively, and the dead time compensation of the inverter 161 is performed.

In the third example, the dq-axes current command values are converted into the 3-phase current model command values, and the compensation signs are estimated. The dead time compensation amount of the inverter calculated from the inverter applying voltage is calculated, and the voltage command values on the dq-axes are feedforward-compensated by the dead time compensation values calculated from the estimated compensation signs. The 3-phase current model command values are used in the compensation signs of the dead time, and the dead time compensation amount is calculated from the inverter applying voltage VR. The compensation values are variable so that the magnitudes and directions of the compensation values are optimal depending on the magnitude of the current command values ($i_d^*$ and $i_d^*$) and the magnitude of the inverter applying voltage VR.

Figure 16:
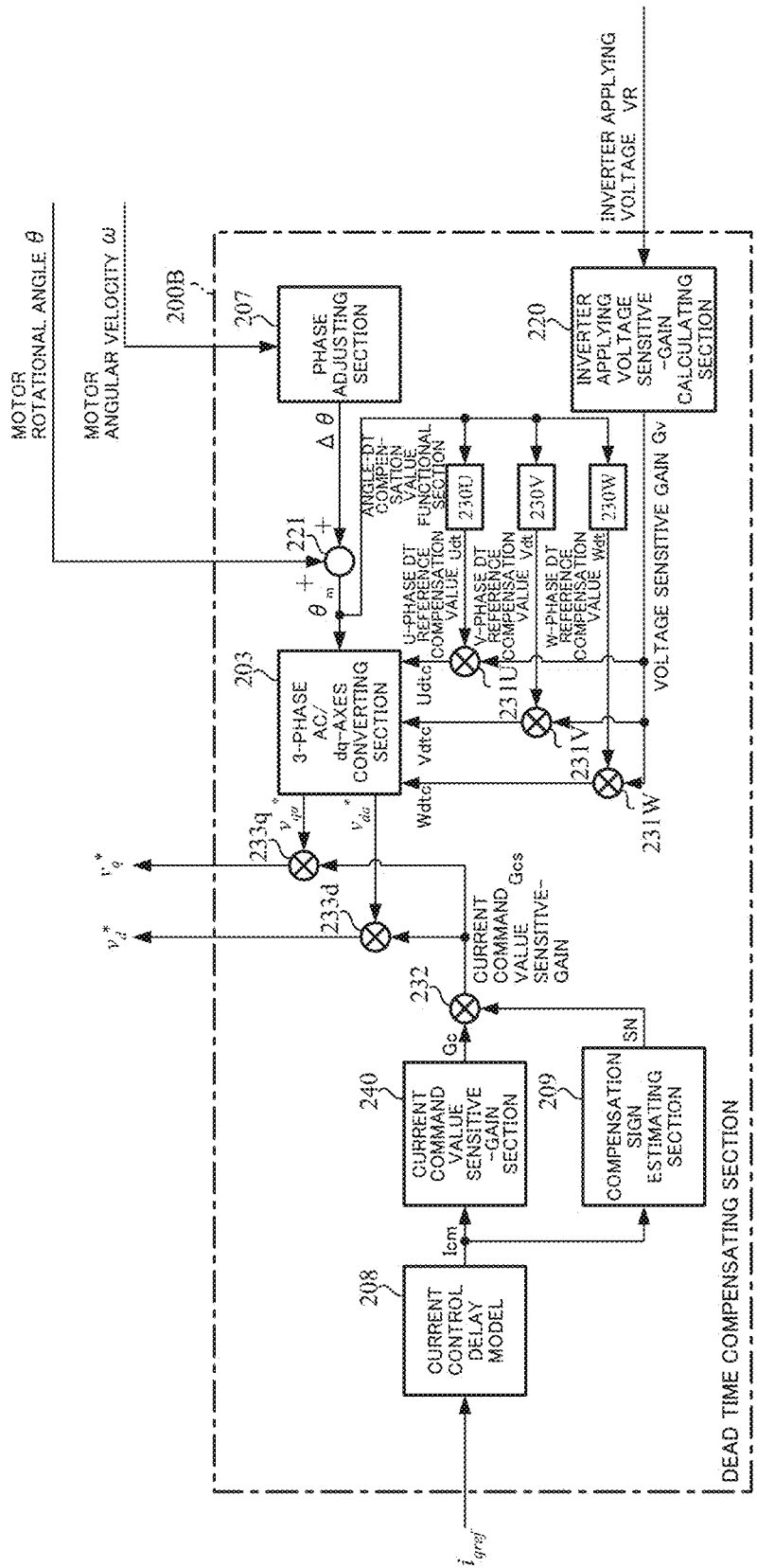
FIG. 16 is a block diagram showing a configuration example (the second example) of the dq-axes dead time compensating section.
Figure 26:
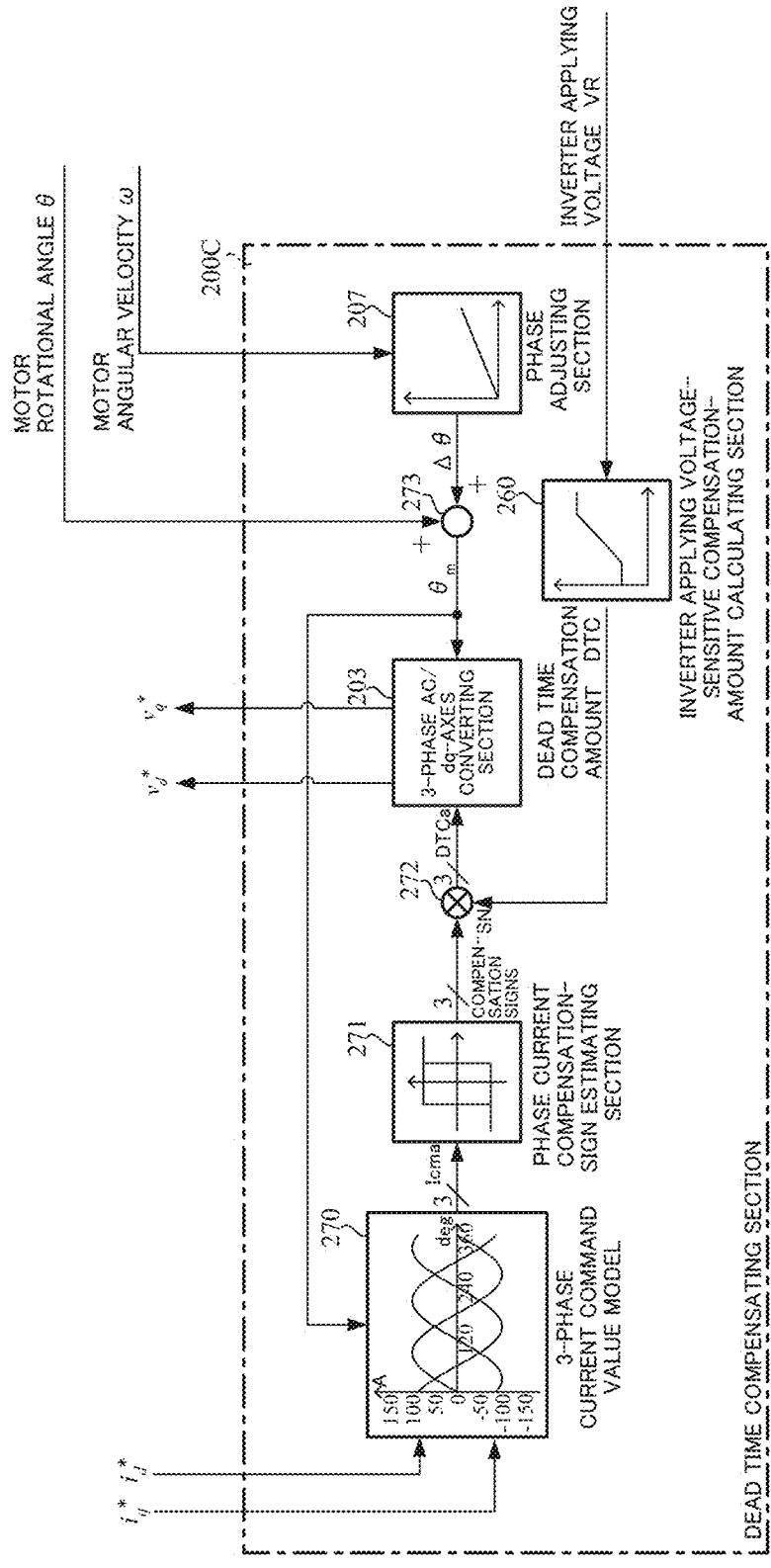
FIG. 26 is a block diagram showing a configuration example (the third example) of the dq-axes dead time compensating section.

The first, second and third examples of the dead time compensating section 200 shown in FIGS. 10, 16 and 26, respectively, may switchingly be used depending on the steering condition, or only one example may be used.

Figure 30:
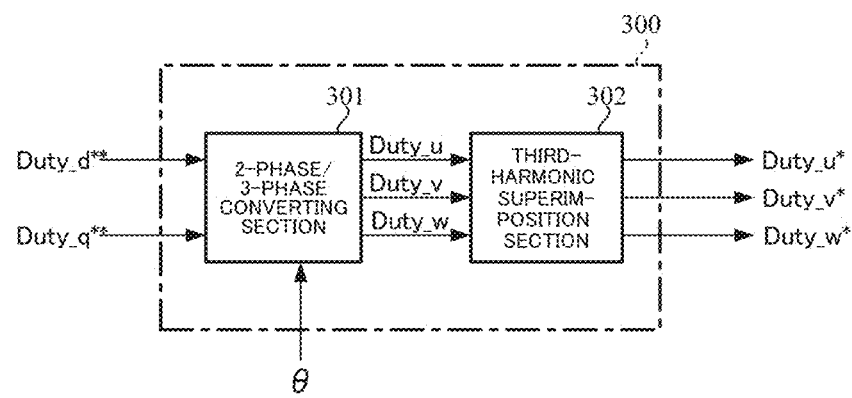
FIG. 30 is a block diagram showing a configuration example of a space vector modulating section.

Next, the space vector modulation will be described. In order to reduce the number of arithmetic operations and the like in the present invention, the space vector conversion calculation is performed after the dimension of the space vector is converted from the dimension of the voltage to the dimension of the duty. As shown in FIG. 30, the space vector modulating section 300 may have a function that converts the 2-phase duty values (the duty command values $Duty\_d^{}$ and $Duty\_q^{}$) on the dq-axes space into the 3-phase duty values ($Duty\_u$, $Duty\_v$ and $Duty\_w$) and superimposes the third harmonic on the 3-phase duty values ($Duty\_u$, $Duty\_v$ and $Duty\_w$). For example, the method of the space vector modulation that the present applicant proposes in Japanese Unexamined Patent Publication No. 2017-70066, WO/2017/098840 and the like may be used.

Figure 31:
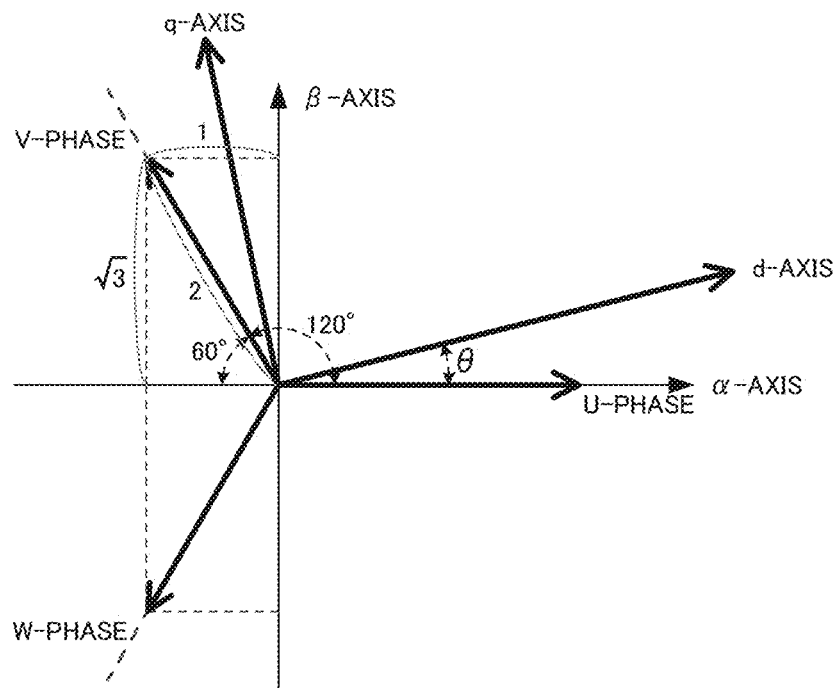
FIG. 31 is a diagram showing an operation example of the space vector modulating section.

The space vector modulation will be described by using the voltage expressions. That is, the space vector modulation has a function that performs a following coordinate transformation based on the voltage command values $V_{d3}$ and $V_{q3}$ on the dq-axes space, the motor rotational angle θ and sector number n (#1 to #6), and controls the rotation of the motor by supplying switching patterns S1 to S6 to the motor. The switching patterns S1 to S6 are corresponding to the sectors #1 to #6, and control turning-ON/turning-OFF of the FETs (the upper arm Q1, Q3 and Q5, and the lower arm Q2, Q4 and Q6) of the inverter with the bridge configuration. With respect to the coordinate transformation, in the space vector modulation, the coordinate transformation from the voltage command values $V_{d3}$ and $V_{q3}$ to the voltage vectors $V_\alpha$ and $V_\beta$ in the α-β coordinate system based on an Expression 19 is performed. A relationship between the coordinate axes that are used in this coordinate transformation and the motor rotational angle θ is shown in FIG. 31.

$$\begin{bmatrix} V_\alpha \\ V_\beta \end{bmatrix} = \begin{bmatrix} \cos\theta & -\sin\theta \\ \sin\theta & \cos\theta \end{bmatrix} \begin{bmatrix} V_d 3 \\ V_q 3 \end{bmatrix} \quad \text{[Expression 19]}$$

As the inverter applying voltage is set to "VR", the relationship between the duty command values $\text{Duty}\_d$ and $\text{Duty}\_q$ and the voltage command values $V_{d3}$ and $V_{q3}$ is represented by the following Expression 20.

$$V_d 3 = VR \times \text{Duty}\_d / \text{Duty}_{100\%}$$

$$V_q 3 = VR \times \text{Duty}\_q / \text{Duty}_{100\%} \quad \text{[Expression 20]}$$

A relationship shown in an expression 21 between a target voltage vector in the d-q coordinate system and a target voltage vector in the α-β coordinate system is existed. The absolute value of the target voltage vector is conserved.

$$|V| = \sqrt{(V_d 3)^2 + (V_q 3)^2} = \sqrt{V_\alpha^2 + V_\beta^2} \quad \text{[Expression 21]}$$

Figure 32:
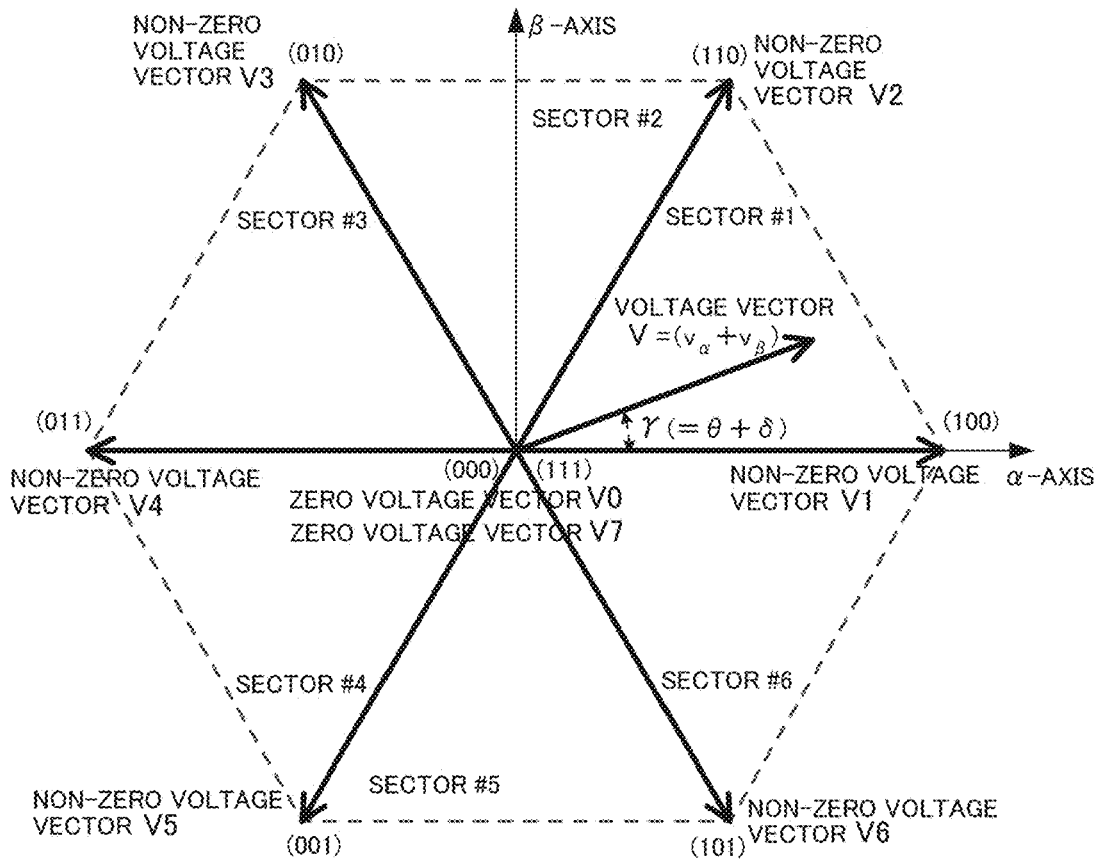
FIG. 32 is a diagram showing an operation example of the space vector modulating section.

In the switching pattern of the space vector control, the output voltage is defined by using eight discrete reference voltage vectors V0 to V7 (non-zero voltage vectors V1 to V6 that the phase differs every π/3 [rad] and zero voltage vectors V0 and V7) that are shown in the space vector diagram of FIG. 32, depending on the switching patterns S1 to S6 of the switching devices (the FETs) (Q1 to Q6). The selection of these reference output voltage vectors V0 to V7 and the occurring time are controlled. By using six regions sandwiched between adjacent reference output voltage vectors, the space vector can be divided into the six sectors #1 to #6, and the target voltage vector V is belong to any one of the sectors #1 to #6, and can be assigned to the sector number. The rotational angle γ in the α-β coordinate system of the target voltage vector V can determine which sector that is separated into a regular hexagon in the α-β space, as shown in FIG. 32, is existed in the target voltage vector V that is a synthetic vector of Vα and Vβ. The rotational angle γ is determined by a sum of the rotational angle θ of the motor and a phase δ obtained from the relationship of the voltage command values $v_{d3}$ and $v_{d3}$ in the d-q coordinate system (γ=θ+δ).

Figure 33:
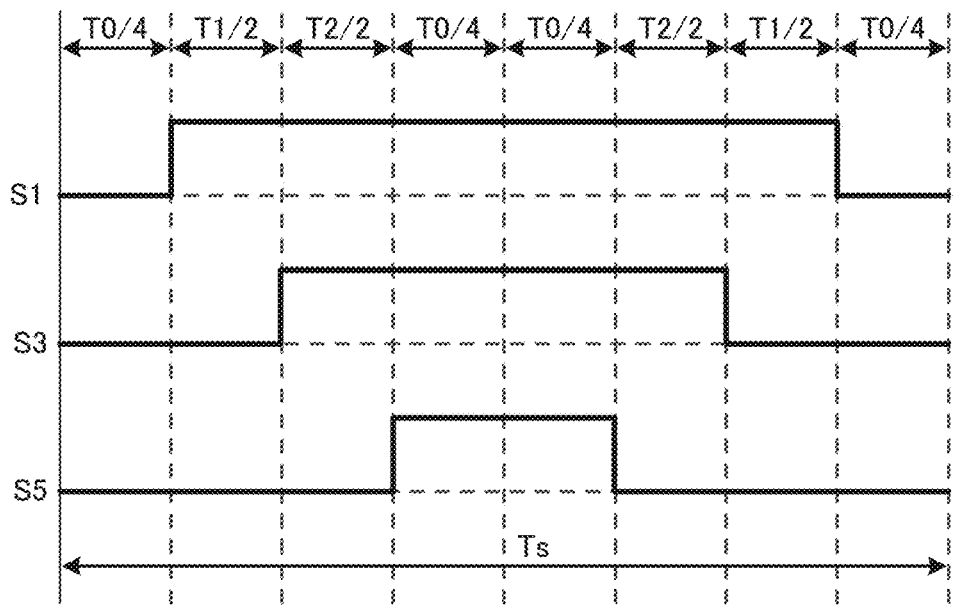
FIG. 33 is a timing chart showing an operation example of the space vector modulating section.

FIG. 33 shows a basic timing chart that the switching pulse width and the timing in the turning-ON/turning-OFF signals S1 to S6 to the FETs are determined in order to output the target voltage vector from the inverter by a digital control by means of the switching patterns S1, S3 and S5 of the inverter in the space vector control. The space vector modulation performs the calculation and the like in every defined sampling period Ts, and outputs the respective pulse widths and the timings in the switching patterns S1 to S6 to which the calculation result is transformed in the next sampling period Ts.

The space vector modulation generates the switching patterns S1 to S6 depending on the sector number that is obtained based on the target voltage vector V. In FIG. 33, in a case of the sector number #1 (n=1), one example of the switching patterns S1 to S6 of the inverter is shown. The signals S1, S3 and S5 show the gate signals of the switching devices Q1, Q3 and Q5 that are corresponding to the upper arm. The horizontal axis denotes a time, and Ts is corresponding to the switching period and is divided into eight periods, T0/4, T1/2, T2/2, T0/4, T0/4, T2/2, T1/2 and T0/4. The periods T1 and T2 are the time depending on the sector number n and the rotational angle γ.

Figure 34A:
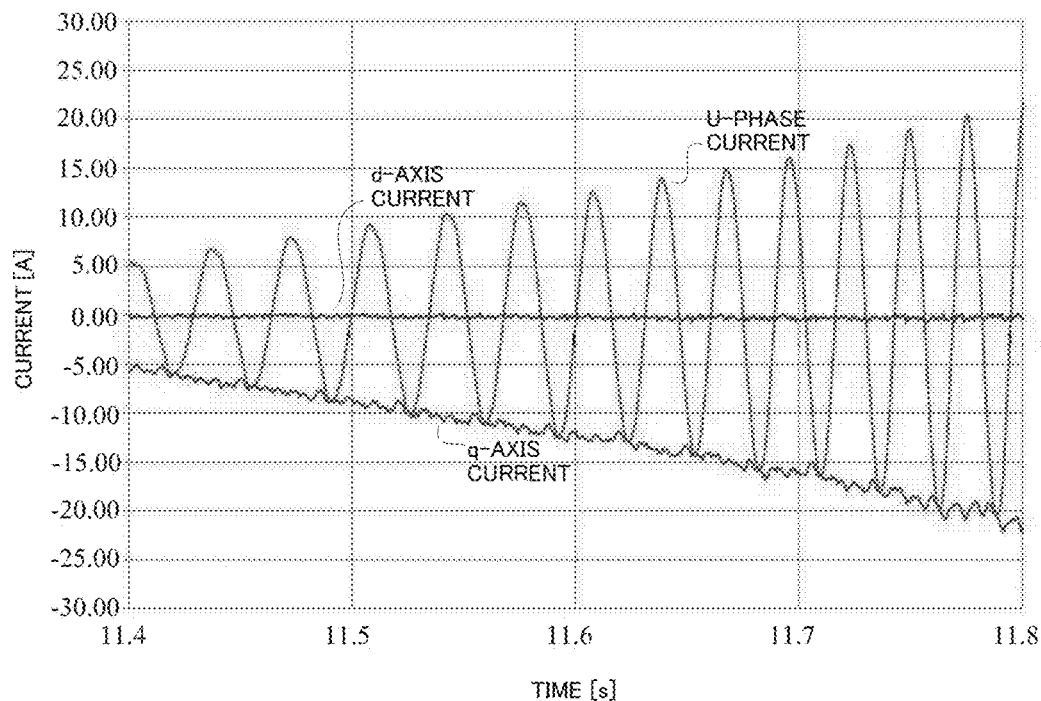
FIGS. 34A and 34B are waveform charts showing an effect of the present invention.
Figure 34B:
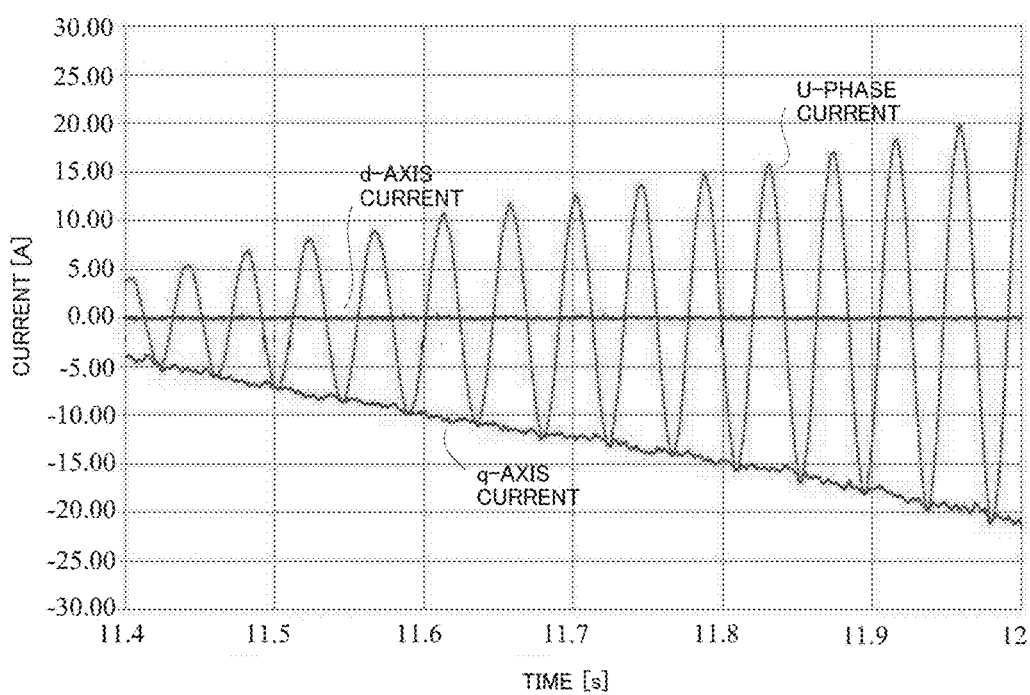

FIGS. 34A and 34B show simulation results by a bench test apparatus to which the actual vehicle is simulated. In a middle speed steering state, in a case that the handle is steered-forward to the right direction, since the current ripples of the dq-axes current waveforms in FIG. 34B obtained after applying the dq-axes disturbance estimating observer are smaller than those in FIG. 34A obtained before applying the dq-axes disturbance estimating observer, it is confirmed that the torque ripple becomes smaller by using the dq-axes disturbance estimating observer. The torque ripple during steering the handle is also improved. In FIGS. 34A and 34B, only the simulation results of the U-phase are shown. The similar simulation results are obtained in other phases.

Figure 35:
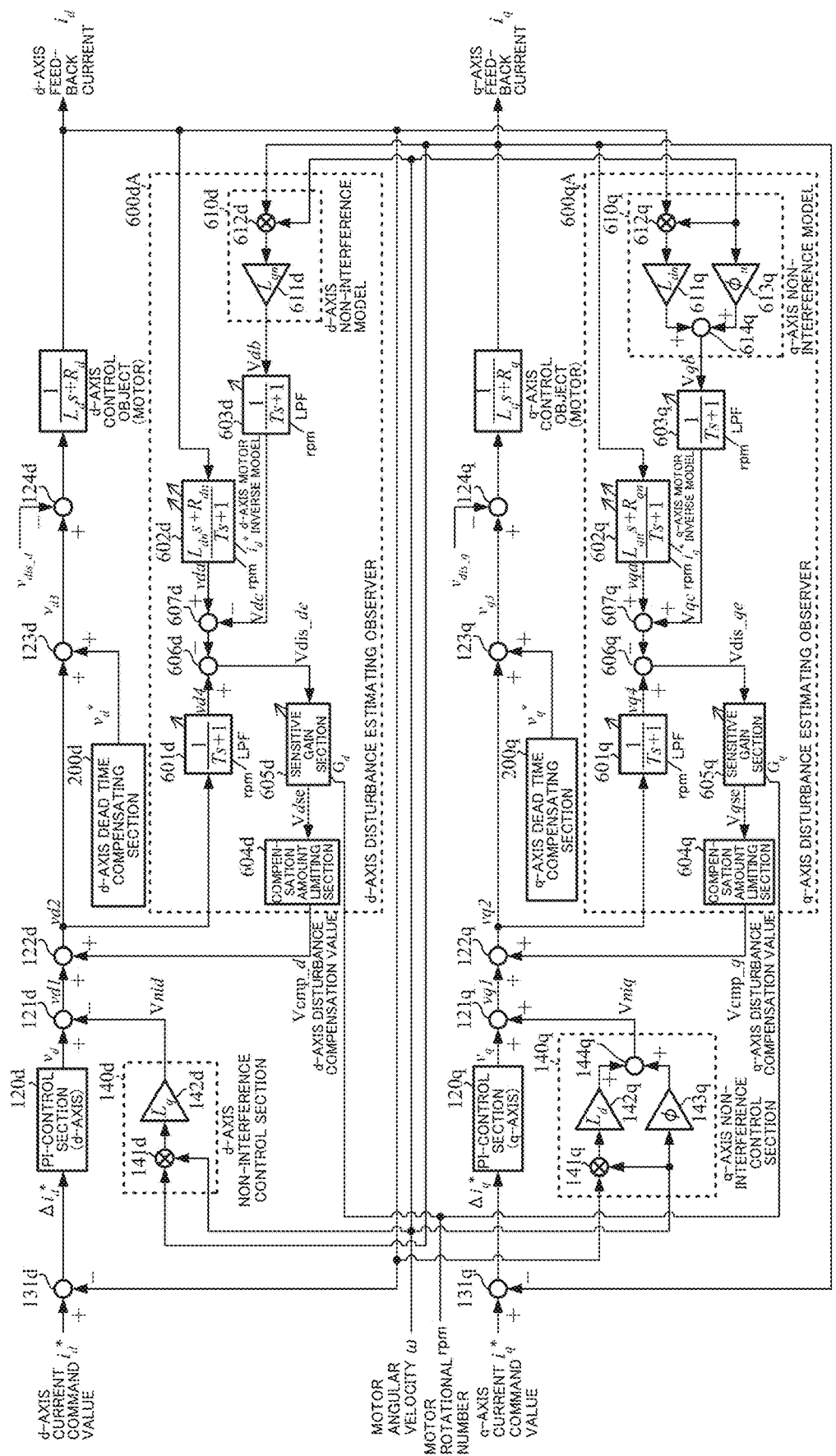
FIG. 35 is a block diagram showing a configuration example (the second embodiment) of the dq-axes disturbance estimating observer.

FIG. 35 shows the dead time compensation system of the second embodiment including the dq-axes disturbance estimating observer 600 and the dq-axes disturbance estimating observer 600 comprises the d-axis disturbance estimating observer 600d A and the q-axis disturbance estimating observer 600q A. In the second embodiment, the d-axis dead time compensating section 200d, the q-axis dead time compensating section 200q, the d-axis non-interference control section 140d and the q-axis non-interference control section 140q whose configuration and function are the same as those of the first embodiment are disposed. Accordingly, the explanations of the d-axis dead time compensating section 200d, the q-axis dead time compensating section 200q, the d-axis non-interference control section 140d and the q-axis non-interference control section 140q are omitted.

The differences between the second embodiment and the first embodiment are that the parameters of the dq-axes motor inverse models 602d and 602q are variable and the cutoff frequencies of the dq-axes LPFs 601d, 603d, 601q and 603q are also variable.

In the second embodiment, the d-axis feedback current $i_d$ and the d-axis current command value $i_d$* which is served as the parameter variable signal are inputted into the d-axis motor inverse model 602d, and the q-axis feedback current $i_d$ and the q-axis current command value $i_d$* which is served as the parameter variable signal are inputted into the q-axis motor inverse model 602q. Thereby, the inductance nominal values $L_{dn}$ and $L_{qn}$, become variable depending on the d-axis current command value $i_d$* and the q-axis current command value $i_d$*. When the motor current increases, the inductance of the motor is varied by the influence of the magnetic saturation and the like due to the motor which is used. Thus, the inductance nominal values $L_{dn}$ and $L_{qn}$ of the d-axis motor inverse model 602d and the q-axis motor inverse model 602q are variable sensitive to the d-axis current command value $i_d$* and the q-axis current command value $i_d$*, respectively, and then the accuracy of the motor model and the compensation accuracy by the disturbance estimating observer are improved.

Figure 36A:
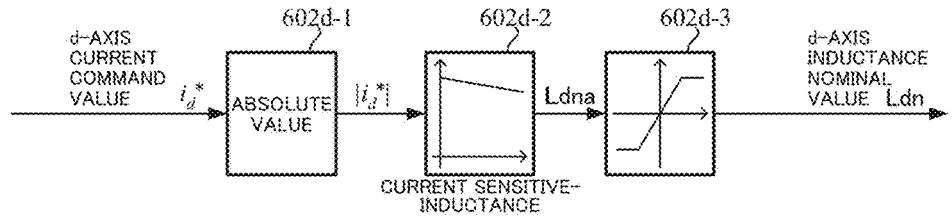
FIGS. 36A and 36B are block diagrams showing an example of units in which an inductance nominal value of the disturbance estimating observer is variable based on the dq-axes current command values.
Figure 36B:
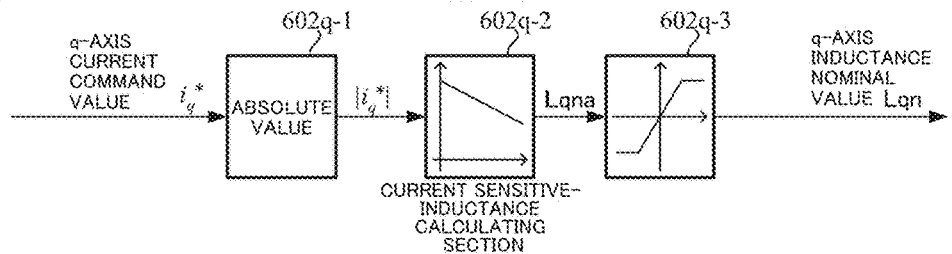
Figure 37A:
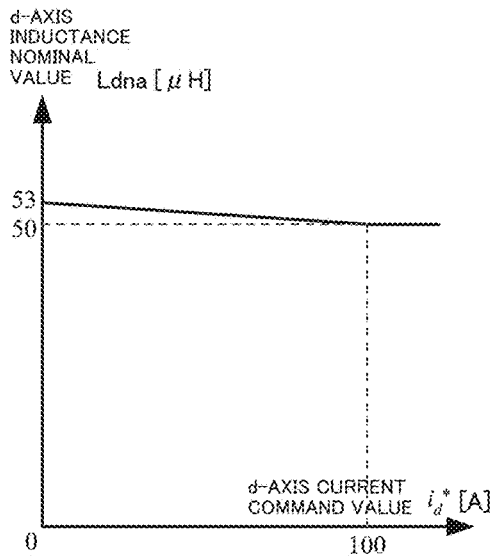
FIGS. 37A and 37B are characteristic diagrams showing a characteristic example of a current sensitive-inductance calculating section.
Figure 37B:
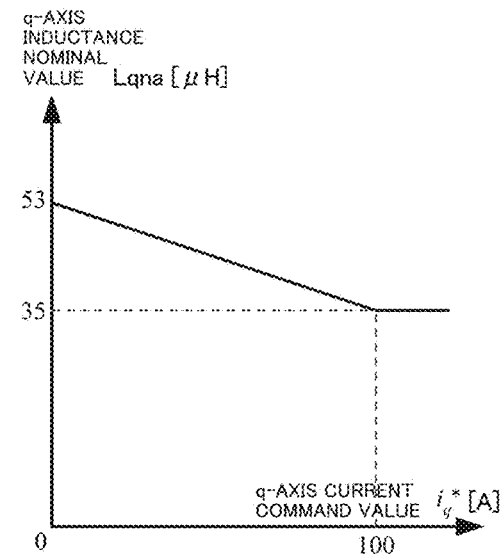

FIGS. 36A and 36B show the configuration examples of the inductance variable control sections in which the inductance nominal values $L_{dn}$ and $L_{qn}$ are set to be variable, respectively. The d-axis current command value $i_d^*$ and the q-axis current command value $i_q^*$ are inputted into absolute value section 602d-1 and 602q-1, and the absolute values $|i_d^*|$ and $|i_q^*|$ are inputted into current sensitive-inductance calculating sections 602d-2 and 602q-2, respectively. As shown in FIG. 37A, the current sensitive-inductance calculating section 602d-2 outputs the inductance nominal value $L_{dna}$ which has a moderate decrease characteristic, and as shown in FIG. 37B, the current sensitive-inductance calculating section 602q-2 outputs the inductance nominal value $L_{qna}$ which has a steep decrease characteristic. The inductance nominal values $L_{dna}$ and $L_{qna}$ from the current sensitive-inductance calculating sections 602d-2 and 602q-2 are inputted into limiters 602d-3 and 602q-3, respectively. The inductance nominal values $L_{dn}$ and $L_{qn}$ whose upper and lower limit values are limited are outputted from the limiter 602d-3 and 602q-3, respectively.

The characteristics of FIGS. 37A and 37B are presented as one example. The inductance nominal values $L_{dna}$ and $L_{qna}$ are different depending on the motor which is used, and can nonlinearly decrease.

Figure 38:
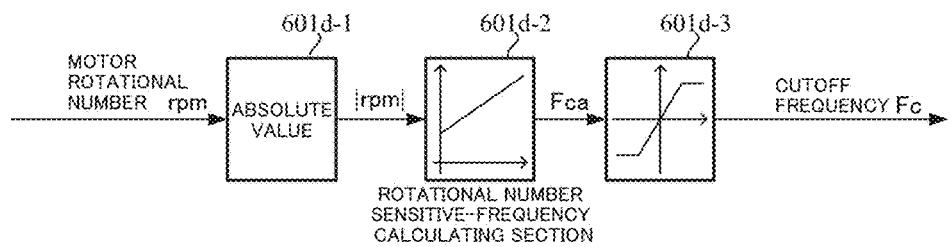
FIG. 38 is a block diagram showing an example of a unit in which cutoff frequencies of a filter of the disturbance estimating observer and the motor inverse model are variable based on a motor rotational number.

In the d-axis disturbance estimating observer 600d, the motor rotational number rpm is inputted into the LPFs 601d and 603d and the d-axis motor inverse model 602d, and the respective cutoff frequencies $F_c$ of the LPFs 601d and 603d and the d-axis motor inverse model 602d are variable in response to the motor rotational number rpm. As well, in the q-axis disturbance estimating observer 600q, the motor rotational number rpm is inputted into the LPFs 601q and 603q and the q-axis motor inverse model 602q, and the respective cutoff frequencies $F_c$ of the LPFs 601q and 603q and the q-axis motor inverse model 602q are variable in response to the motor rotational number rpm. All of the configurations of the cutoff frequency variable control sections whose cutoff frequency $F_c$ is variable are the same and, for example, the configuration of the LPF 601d is shown in FIG. 38. That is, the motor rotational number rpm is inputted into the absolute value section 601d-1 and the absolute value |rpm| is inputted into the rotational number sensitive-frequency calculating section 601d-2. The rotational number sensitive-frequency calculating section 601d-2 has a characteristic shown in FIG. 39 that, for example, the cutoff frequency $F_{ca}$ linearly increases when the motor rotational number rpm is lower than 4000 [rpm] and is a constant value (1200 [Hz]) when the motor rotational number rpm is equal to or higher than 4000 [rpm]. The cutoff frequency $F_{ca}$ from the rotational number sensitive-frequency calculating section 601d-2 is inputted into the limiter 601d-3, and the cutoff frequency $F_c$ whose upper and lower limit values are limited is outputted from the limiter 601d-3. As described above, the respective cutoff frequencies are variable in response to the motor rotational number rpm. When the high speed steering in which the followability is important is performed, the respective cutoff frequencies of the LPF 601d and the like are set to higher frequencies and the responsibility is enhanced. When the steering holding in which the grip feeling is important is performed, since the input signal is easily affected by the noise which is included therein, the respective cutoff frequencies are set to lower frequencies and the noise-resistance is enhanced.

Figure 39:
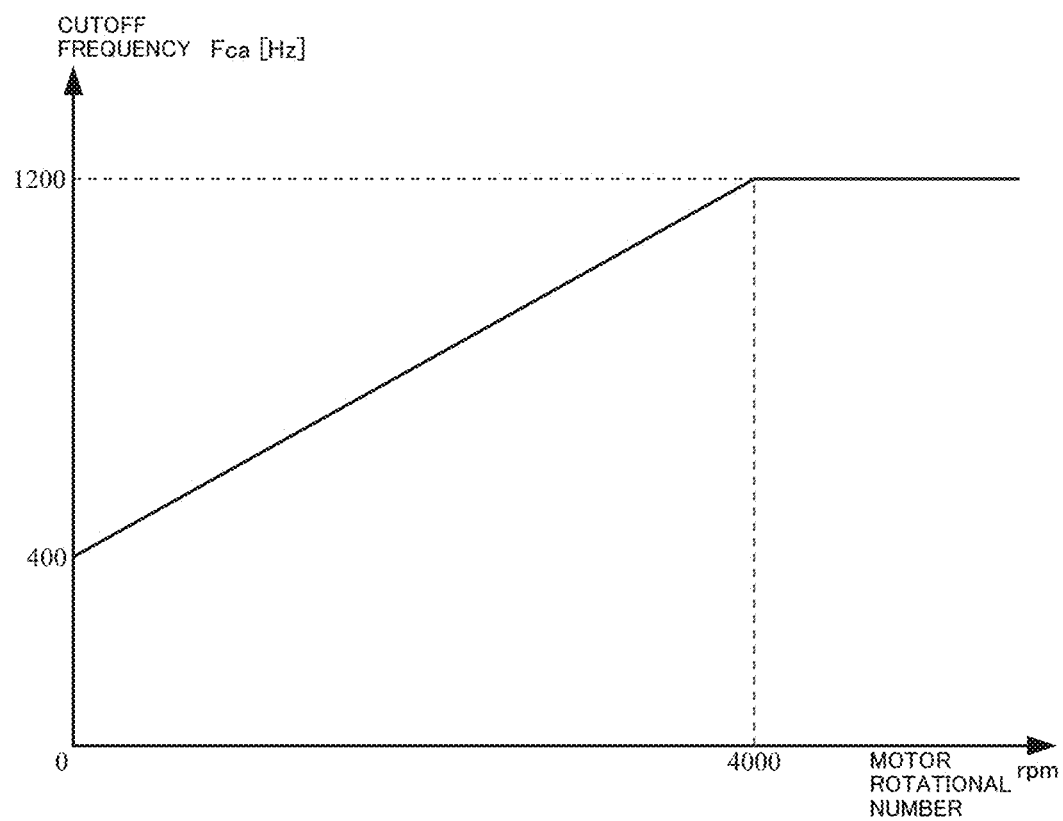
FIG. 39 is a characteristic diagram showing a characteristic example of a rotational number sensitive-frequency calculating section.

The characteristic of FIG. 39 is presented as one example. The respective cutoff frequencies are different depending on the actual vehicle tuning and the system, and can nonlinearly increase. The relationship between the respective time constants T of the LPFs and the motor inverse model and the respective cutoff frequencies $F_c$ is represented by the following Expression 22.

$$T = \frac{1}{2\pi F_c} \quad \text{[Expression 22]}$$

The configuration of the q-axis disturbance estimating observer 600q is almost the same as that of the d-axis disturbance estimating observer 600d. The motor rotational number rpm is inputted into the LPFs 601q and 603q for band-limiting and the q-axis motor inverse model 602q, and the q-axis current command value $i_q^*$ is also inputted into the q-axis motor inverse model 602q. The inductance variable control section and the cutoff frequency variable control section which performs variable control are described above.

Figure 40A:
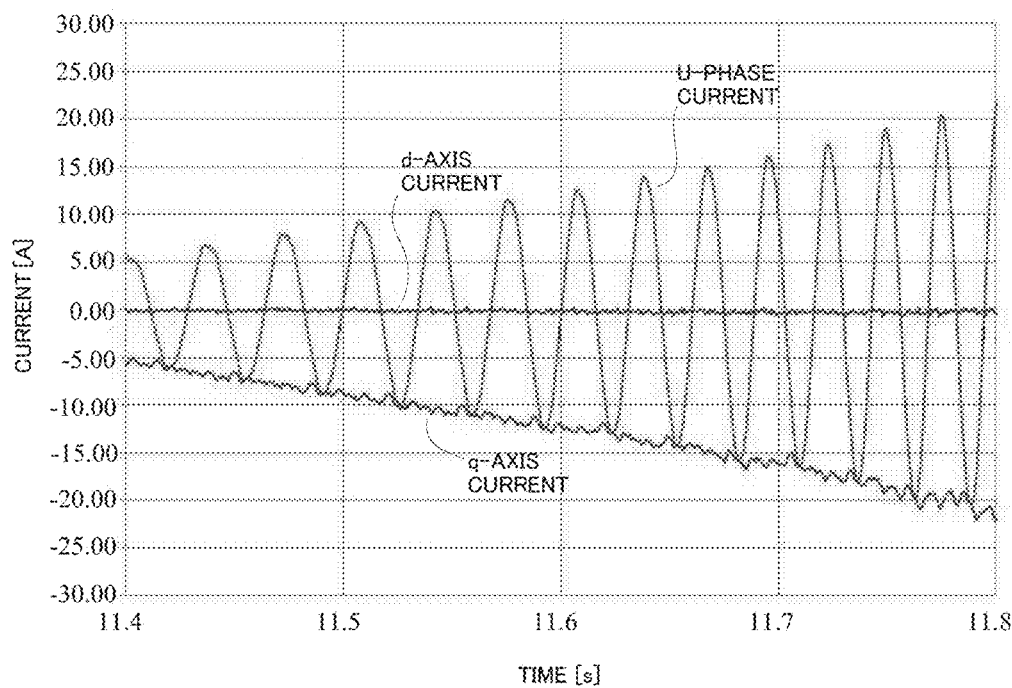
FIGS. 40A and 40B are waveform charts showing an effect of the present invention.
Figure 40B:
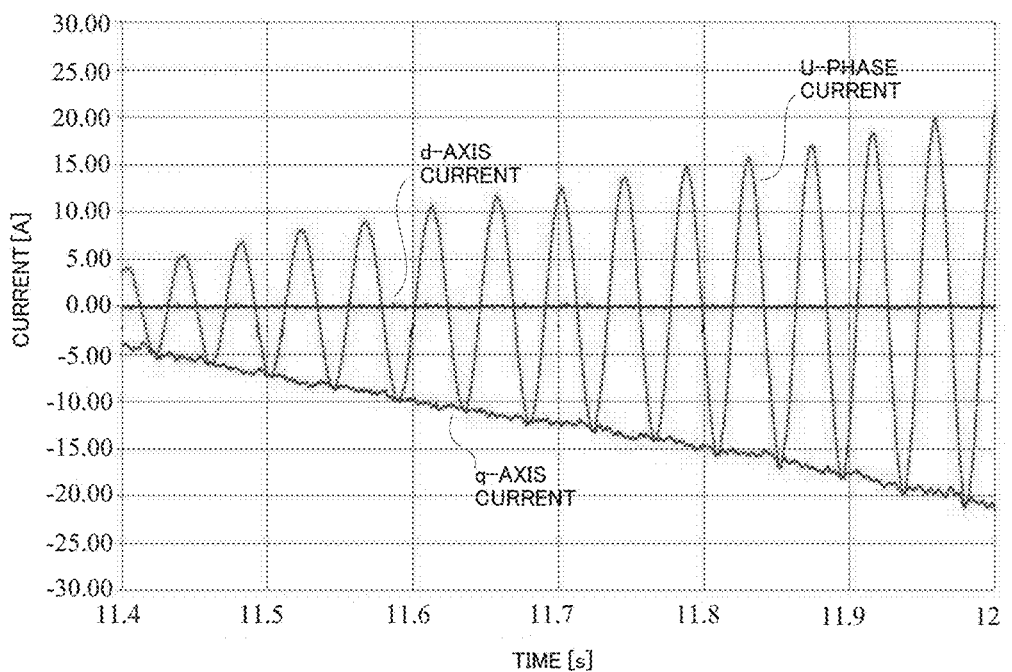

FIGS. 40A and 40B show simulation results by a bench test apparatus to which the actual vehicle is simulated. In a middle speed steering state, in a case that the handle is steered-forward to the right direction, since the current ripples of the dq-axes current waveforms in FIG. 40B obtained after applying the dq-axes disturbance estimating observer are smaller than those in FIG. 40A obtained before applying the dq-axes disturbance estimating observer, it is confirmed that the torque ripple becomes smaller by using the dq-axes disturbance estimating observer. The torque ripple during steering the handle is also improved. In FIGS. 40A and 40B, only the simulation results of the U-phase are shown. The similar simulation results are obtained in other phases.

Figure 41:
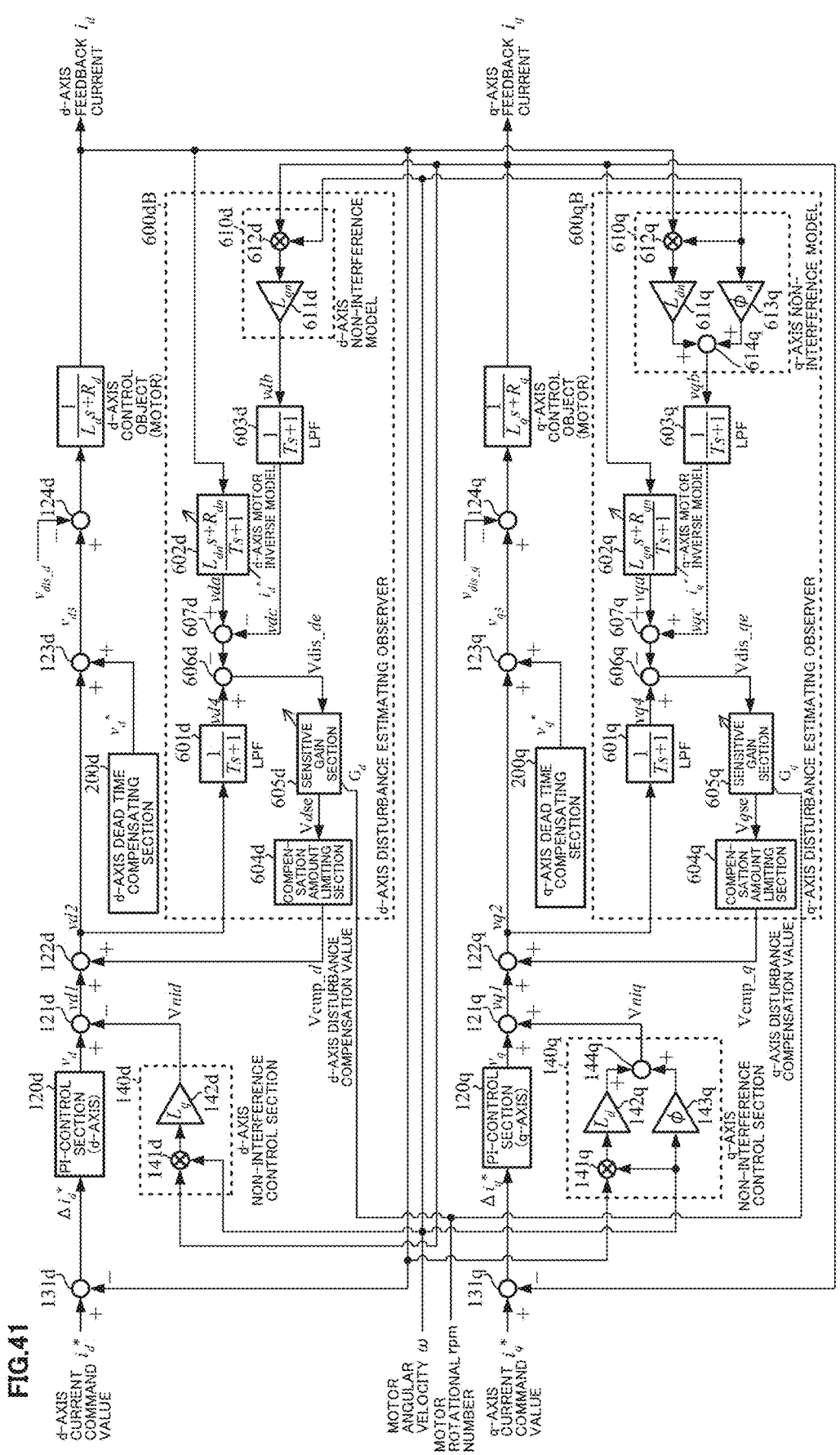
FIG. 41 is a detailed block diagram showing a configuration example (the third embodiment) of the dq-axes disturbance estimating observer.

In the above second embodiment, the inductance nominal values $L_{dn}$ and $L_{qn}$ of the d-axis motor inverse model 602d and the q-axis motor inverse model 602q are variable depending on the d-axis current command value $i_d^*$ and the q-axis current command value $i_q^*$, respectively, and the respective cutoff frequencies $F_c$ of the LPFs and the motor inverse models are also variable in response to the motor rotational number rpm. As shown in FIG. 41 corresponding to FIG. 35, only the inductance nominal values $L_{dn}$ and $L_{qn}$ of the d-axis motor inverse model 602d and the q-axis motor inverse model 602q may be variable depending on the d-axis current command value $i_d^*$ and the q-axis current command value $i_q^*$, respectively (the third embodiment). That is, in the third embodiment, the d-axis current command value $i_d^*$ is inputted into the motor inverse model 602d, the q-axis current command value $i_q^*$ is inputted into the motor inverse model 602q, and the inductance nominal values $L_{dn}$ and $L_{qn}$ are set to be variable. In the d-axis disturbance estimating observer 600dB and the q-axis disturbance estimating observer 600qB of the third embodiment, the respective cutoff frequencies $F_c$ are not variable in response to the motor rotational number rpm.

Figure 42:
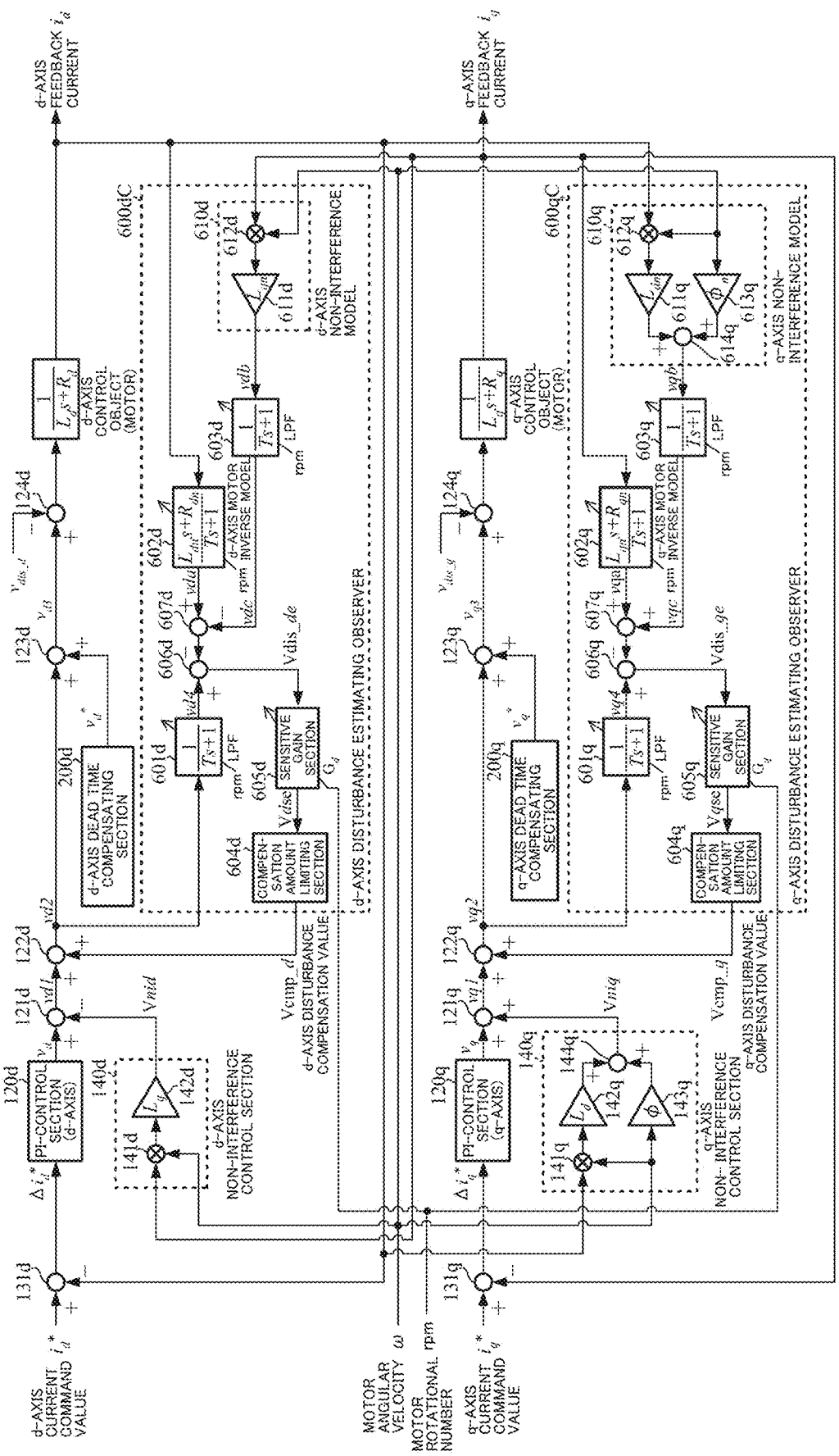
FIG. 42 is a detailed block diagram showing a configuration example (the fourth embodiment) of the dq-axes disturbance estimating observer.

In the fourth embodiment shown in FIG. 42, the motor rotational number rpm is inputted into the LPFs 601d and 603d, the motor inverse model 602d, the LPFs 601q and 603q and the motor inverse model 602q. The dq-axes current command values $i_d^*$ and $i_q^*$ are not inputted into the motor inverse model 602d and 602q and the configuration that the inductance nominal values $L_{dn}$ and $L_{qn}$ are not variable is adopted. That is, in the fourth embodiment, only the cutoff frequencies of the LPFs 601d and 603d, the motor inverse model 602d, the LPFs 601q and 603q and the motor inverse model 602q are variable.

Figure 43:
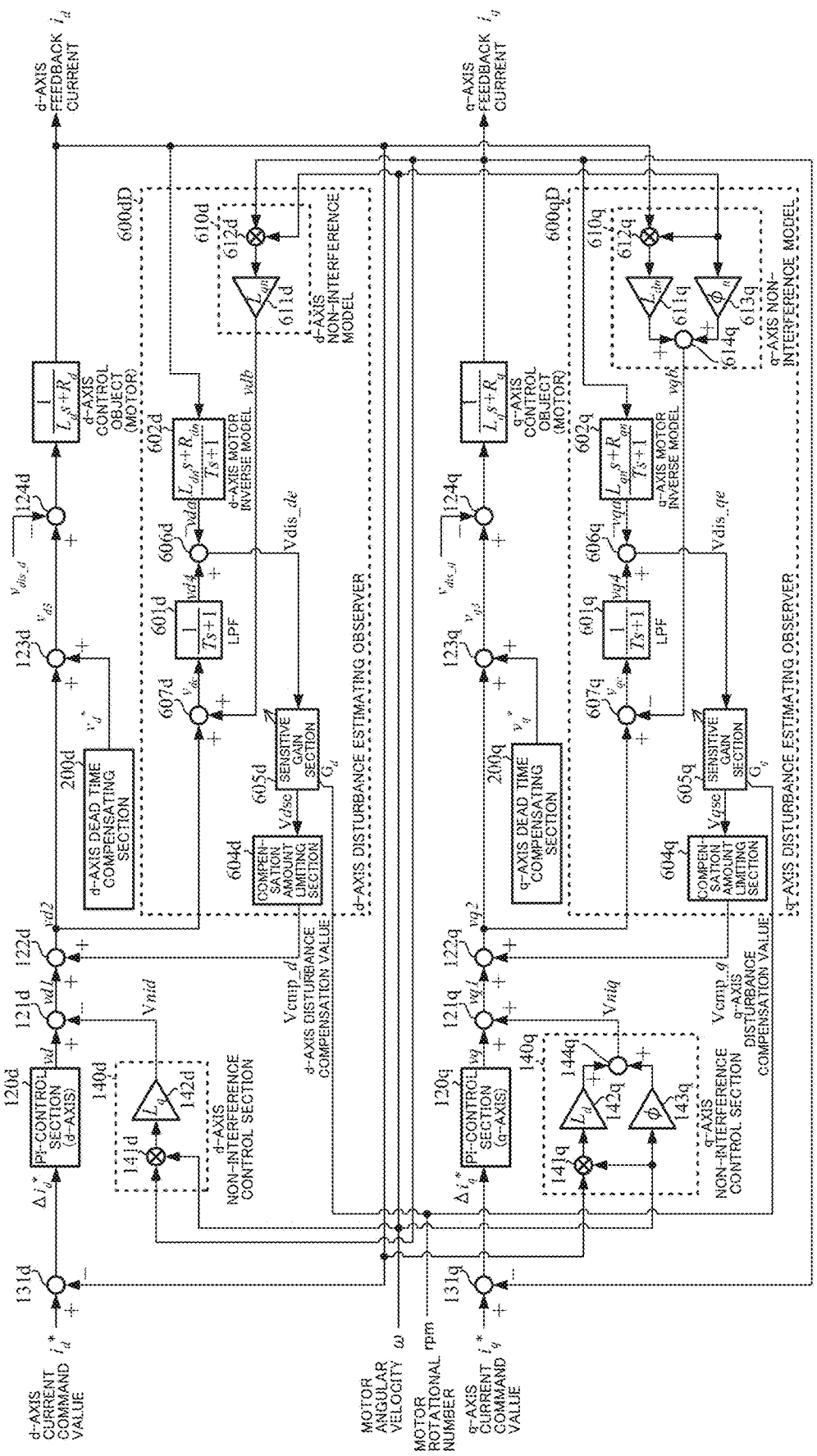
FIG. 43 is a detailed block diagram showing a configuration example (the fifth embodiment) of the present invention.

FIG. 43 shows the fifth embodiment of the present invention. In order to reduce the processing time of the MPU (the MCU) and the time for developing the programs, the shared use of the filters are performed. That is, the LPFs 603$d$ and 603$q$ are removed, the voltages v$_{db}$ and v$_{db}$ from the d-axis non-interference model 610$d$ and the q-axis non-interference model 610$q$ are inputted into the adding section 607$d$ and the subtracting section 607$q$, and the addition result V$_{dc}$ and the subtraction result V$_{qc}$ are inputted into the LPFs 601$d$ and 601$q$, respectively. Thereby, the number of the filters is halved and the processing time can also be shortened.

In the fifth embodiment, the inductance nominal values L$_{dn}$ and L$_{qn}$ based on the dq-axes current command values i$_d$* and i$_q$* and the cutoff frequencies based on the motor rotational number rpm can be variable.

The column type electric power steering apparatus has been described above. The present invention can also be applied to the rack type electric power steering apparatus.

EXPLANATION OF REFERENCE NUMERALS 1 handle (steering wheel)
2 column shaft (steering shaft, handle shaft)
10 torque sensor
20, 100 motor
30 control unit (ECU)
35 PI-control section
36, 160 PWM-control section
37, 161 inverter
110 angle detecting section
130, 203 3-phase AC/dq-axes converting section
140 dq-axes non-interference control section
200, 200A-200C dq-axes dead time compensating section
204 3-phase command voltage calculating section
205 voltage detection delay model
207 phase adjusting section
210 midpoint voltage estimating section
220 inverter applying voltage sensitive-gain calculating section
250 compensation amount limiting section
260 inverter applying voltage-sensitive compensation-amount calculating section
270 3-phase current command value model
271 phase current compensation-sign estimating section
300 space vector modulating section
301 2-phase/3-phase converting section
302 third-harmonic superimposition section
600 dq-axes disturbance estimating observer 600$d$, 600$d$A, 600$d$B, 600$d$C, 600$d$D
d-axis disturbance estimating observer 600$q$, 600$q$A, 600$q$B, 600$q$C, 600$q$D q-axis disturbance estimating observer
700 duty calculating section

The invention claimed is:

1. A motor control unit that vector-controls a 3-phase brushless motor based on a d-axis current command value and a q-axis current command value, converts 3-phase current detection values of said 3-phase brushless motor into a d-axis feedback current and a q-axis feedback current, calculates a d-axis deviation current between said d-axis current command value and said d-axis feedback current, and a q-axis deviation current between said q-axis current command value and said q-axis feedback current, calculates a d-axis voltage command value and a q-axis voltage command value by current-controlling said d-axis deviation current and said q-axis deviation current, performing a d-axis non-interference control based on said q-axis feedback current and a motor angular velocity of said 3-phase brushless motor, and performing a q-axis non-interference control based on said d-axis feedback current and said motor angular velocity, and controls said 3-phase brushless motor by 3-phase duty command values based on said d-axis voltage command value and said q-axis voltage command value via an inverter, comprising:

a central processing unit (CPU) configured to implement instructions to perform the following operations:
  a dq-axes dead time compensating operation to calculate dq-axes dead time compensation values of said inverter and perform a dead time compensation;
  dq-axes disturbance estimating operation to input said d-axis current command value, said q-axis current command value, a motor rotational number, said motor angular velocity, said d-axis feedback current, said q-axis feedback current, said d-axis voltage command value and said q-axis voltage command value, and calculate and output a d-axis disturbance compensation value and a q-axis disturbance compensation value; and
  a disturbance estimation operation to estimate a disturbance, which cannot be compensated by said dead time compensation of said inverter, by respectively adding said d-axis disturbance compensation value and said q-axis disturbance compensation value to said d-axis voltage command value and said q-axis voltage command value.

2. The motor control unit according to claim 1,
wherein said dq-axes disturbance estimating operation comprises:
a d-axis disturbance estimating operation to treat a d-axis control object; and
a q-axis disturbance estimating operation to treat a q-axis control object.

3. The motor control unit according to claim 2,
wherein said d-axis disturbance estimating operation comprises:
a first d-axis low pass filtering (LPF) operation to input an added value in which said d-axis disturbance compensation value and said d-axis voltage command value added;
a d-axis motor inverse operation to input said d-axis feedback current;
a d-axis non-interference operation to input said q-axis feedback current and said motor angular velocity;
a second d-axis LPF operation to input an output of said d-axis non-interference operation;
a subtracting operation to subtract a d-axis deviation between an output of said d-axis motor inverse operation and an output of said second d-axis LPF operation from an output of said first d-axis LPF operation; and
a d-axis limiting operation to limit an output of said subtracting operation in response to said motor rotational number, and
wherein said q-axis disturbance estimating operation comprises:
a first q-axis LPF operation to input an added value in which said q-axis disturbance compensation value and said q-axis voltage command value are added;
a q-axis motor inverse operation to input said q-axis feedback current;
a q-axis non-interference operation to input said d-axis feedback current and said motor angular velocity;
a second q-axis LPF operation to input an output of said q-axis non-interference operation;

an adding and subtracting operation to add with an output of said q-axis motor inverse operation and an output of said second q-axis LPF operation and subtract said added result from an output of said first q-axis LPF operation; and a q-axis limiting operation to limit an output of said adding and subtracting operation in response to said motor rotational number.

4. The motor control unit according to claim 3, wherein said d-axis non-interference operation comprises:

a d-axis multiplying operation to multiply said q-axis feedback current by said motor angular velocity, and a d-axis gain operation to multiply an output of said d-axis multiplying operation by a gain, and said q-axis non-interference operation comprises:

a q-axis multiplying operation to multiply said d-axis feedback current by said motor angular velocity, a first q-axis gain operation to multiply an output of said q-axis multiplying operation by a first gain, a second q-axis gain operation to multiply said motor angular velocity by a second gain, and a second q-axis adding operation to add with an output of said first q-axis gain operation and an output of said second q-axis gain operation.

5. The motor control unit according to claim 3, wherein said d-axis limiting operation comprises:

a d-axis sensitive gain operation sensitive to said motor rotational number; and a d-axis compensation amount limiting operation to limit a maximum value of a d-axis compensation amount.

6. The motor control unit according to claim 3, wherein said q-axis limiting operation comprises:

a q-axis sensitive gain operation sensitive to said motor rotational number; and a q-axis compensation amount limiting operation to limit a maximum value of a q-axis compensation amount.

7. The motor control unit according to claim 3, wherein cutoff frequencies of said first d-axis LPF operation and said second d-axis LPF operation are variable based on said motor rotational number, an inductance component of said d-axis motor inverse operation is variable based on said d-axis current command value, cutoff frequencies of said first q-axis LPF operation and said second q-axis LPF operation are variable based on said motor rotational number, and an inductance component of said q-axis motor inverse operation is variable based on said q-axis current command value.

8. The motor control unit according to claim 7, wherein, when said motor rotation number is high, respective cutoff frequencies of said first d-axis LPF operation, said second d-axis LPF operation, said first q-axis LPF operation and said second q-axis LPF operation are set to be higher and a responsibility is enhanced, and when said motor rotation number is low, respective cutoff frequencies of said first d-axis LPF operation, said second d-axis LPF operation, said first q-axis LPF operation and said second q-axis LPF operation are set to be lower and a noise-resistance is enhanced.

9. The motor control unit according to claim 7, wherein, when said d-axis current command value becomes larger, an inductance component of said d-axis motor inverse operation is variable so as to become smaller, and when said q-axis current command value becomes larger, an inductance component of said q-axis motor inverse operation is variable so as to become smaller.

10. The motor control unit according to claim 1, wherein said dq-axes dead time compensating operation calculates said dq-axes dead time compensation values by using a configuration depending on a steering state.

11. The motor control unit according to claim 10, wherein said dq-axes dead time compensating operation calculates a 3-phase dead time reference compensation value based on a motor rotational angle, processes said 3-phase dead time reference compensation value by using a gain and a sign, and calculates said dq-axes dead time compensation values by performing a 3-phase alternating current (AC)/dq-axes conversion to said processed 3-phase dead time reference compensation value.

12. The motor control unit according to claim 10, wherein said dq-axes dead time compensating operation estimates 3-phase detection voltages based on 3-phase motor terminal voltages, estimates loss voltages due to a dead time of said inverter from a difference between 3-phase correction command voltages calculated from said 3-phase duty command values and said 3-phase detection voltages, and calculates said dq-axes dead time compensation values by compensating said loss voltages.

13. The motor control unit according to claim 10, wherein said dq-axes dead time compensating operation estimates compensation signs of 3-phase current model command values in which said d-axis current command value and said q-axis current command value are converted into a 3-phase current command values, calculates a dead time compensation amount based on an inverter applying voltage, and calculates said dq-axes dead time compensation values by multiplying said dead time compensation amount with said compensation signs and converting said multiplied results into 2-phase values.

14. The motor control unit according to claim 1, further comprising:

a space vector modulating operation to convert said d-axis voltage command value and said q-axis voltage command value into 2-phase duty command values, convert said 2-phase duty command values into 3-phase values, and output voltage command values obtained by superimposing a third harmonic on said 3-phase values.

15. The motor control unit according to claim 1, wherein parameters of said dq-axes disturbance estimating operation are variable based on said d-axis current command value, said q-axis current command value and said motor rotational number.

16. An electric power steering apparatus that is equipped with the motor control unit according to claim 1, and applies an assist torque to a steering system of a vehicle by driving said 3-phase brushless motor.

17. A motor control unit that vector-controls a 3-phase brushless motor based on a d-axis current command value and a q-axis current command value, converts 3-phase current detection values of said 3-phase brushless motor into a d-axis feedback current and a q-axis feedback current, calculates a d-axis deviation current between said d-axis current command value and said d-axis feedback current, and a q-axis deviation current between said q-axis current command value and said q-axis feedback current, calculates a d-axis voltage command value and a q-axis voltage command value by current-controlling said d-axis deviation current and said q-axis deviation current, performing a d-axis non-interference control based on said q-axis feedback current and a motor angular velocity of said 3-phase brushless motor, and performing a q-axis non-interference control based on said d-axis feedback current and said motor angular velocity, and controls said 3-phase brushless motor by 3-phase duty command values based on said d-axis voltage command value and said q-axis voltage command value via an inverter, comprising:
- a central processing unit (CPU) configured to implement instructions to perform the following operations:
- a d-axis dead time compensating operation and a q-axis dead time compensating operation to calculate dead time compensation values of said inverter and perform a dead time compensation;
- a d-axis disturbance estimating operation to input said d-axis current command value, said d-axis voltage command value, said d-axis feedback current, said q-axis feedback current, a motor angular velocity and a motor rotational number, and calculate and output a d-axis disturbance compensation value; and
- a q-axis disturbance estimating operation to input said q-axis current command value, said q-axis voltage command value, said q-axis feedback current, said d-axis feedback current, said motor angular velocity and said motor rotational number, and calculate and output a q-axis disturbance compensation value,
- wherein said d-axis disturbance estimating operation comprises:
- a d-axis non-interference operation to input said q-axis feedback current and said motor angular velocity;
- a d-axis low pass filter (LPF) operation to input a second d-axis addition value which adds an output of said d-axis non-interference operation to a first d-axis addition value which adds said d-axis voltage current command value to said d-axis disturbance compensation value;
- a d-axis motor inverse operation to input said d-axis feedback current,
- a d-axis subtracting operation to calculate a d-axis deviation voltage by subtracting an output of said d-axis motor inverse operation from an output of said d-axis LPF operation;
- a d-axis sensitive gain operation to multiply said d-axis deviation voltage with a gain, depending on said motor rotational number; and
- a d-axis compensation value limiting operation to limit an output of said d-axis sensitive gain operation and output said d-axis disturbance compensation value,
- wherein said q-axis disturbance estimating operation comprises:
- a q-axis non-interference operation to input said d-axis feedback current and said motor angular velocity;
- a q-axis LPF operation to input a q-axis subtraction value which subtracts an output of said q-axis non-interference operation from a first q-axis addition value which adds said q-axis voltage command value to said q-axis disturbance compensation value;
- a q-axis motor inverse operation to input said q-axis feedback current;
- a q-axis subtracting operation to calculate a q-axis deviation voltage by subtracting an output of said q-axis motor inverse operation from an output of said q-axis LPF operation;
- a q-axis sensitive gain operation to multiply said q-axis deviation voltage with a gain, depending on said motor rotational number; and
- a q-axis compensation value limiting operation to limit an output of said q-axis sensitive gain operation and output said q-axis disturbance compensation value, and
- wherein said motor control unit estimates a disturbance, which cannot be compensated by said dead time compensation of said inverter, by adding said d-axis disturbance compensation value to said d-axis voltage command value and adding said q-axis disturbance compensation value to said q-axis voltage command value.

18. The motor control unit according to claim 17, wherein said gain of said d-axis sensitive gain operation is sensitive to said motor rotational number.

19. The motor control unit according to claim 17, wherein said gain of said q-axis sensitive gain operation is sensitive to said motor rotational number.

20. An electric power steering apparatus that is equipped with the motor control unit according to claim 17, and applies an assist torque to a steering system of a vehicle by driving said 3-phase brushless motor.

* * * * *